United States Patent [19]
Gin et al.

[11] Patent Number: 5,849,215
[45] Date of Patent: Dec. 15, 1998

[54] HIGHLY ORDERED NANOCOMPOSITES VIA A MONOMER SELF-ASSEMBLY IN SITU CONDENSATION APPROACH

[75] Inventors: Douglas L. Gin, Moraga, Calif.; Walter M. Fischer, Leoben, Austria; David H. Gray, El Cerrito; Ryan C. Smith, Berkeley, both of Calif.

[73] Assignee: The Regents of the University of California, Oakland, Calif.

[21] Appl. No.: 780,596

[22] Filed: Jan. 8, 1997

[51] Int. Cl.$^6$ .................................................. C09K 19/52
[52] U.S. Cl. ........................................ 252/299.01; 428/1
[58] Field of Search .......................... 252/299.01; 428/1; 507/125; 522/160; 525/333.3

[56] References Cited

PUBLICATIONS

Gary et al. "Synthesis of Ordered Nanocomposites Using a Monomer Self-Assembly Approach", Polym. Prepr., Am. Chem. Soc, Mar. 1996.

CA 126: 278043, 1997.

Primary Examiner—Shean C. Wu
Attorney, Agent, or Firm—Townsend and Townsend and Crew LLP

[57] ABSTRACT

A method for synthesizing composites with architectural control on the nanometer scale is described. A polymerizable lyotropic liquid-crystalline monomer is used to form an inverse hexagonal phase in the presence of a second polymer precursor solution. The monomer system acts as an organic template, providing the underlying matrix and order of the composite system. Polymerization of the template in the presence of an optional cross-linking agent with retention of the liquid-crystalline order is carried out followed by a second polymerization of the second polymer precursor within the channels of the polymer template to provide an ordered nanocomposite material.

34 Claims, 12 Drawing Sheets

Representative Examples of Lyotropic LC Systems

I MeOH, TsOH, (87%)  
II Benzene, AlCl₃, Δ (46%)  
III Acetyl Chloride, AlCl₃ (67%)  
IV NaBH₄ (95%)  
V Fused KHSO₄, Δ (55%)  
VI KOH (98%)  
VII NaOH (98%)

$R_1 = CH_3(CH_2)_7-$
$R_2 = -(CH_2)_7COOH$
$R_3 = -(CH_2)_7COOMe$

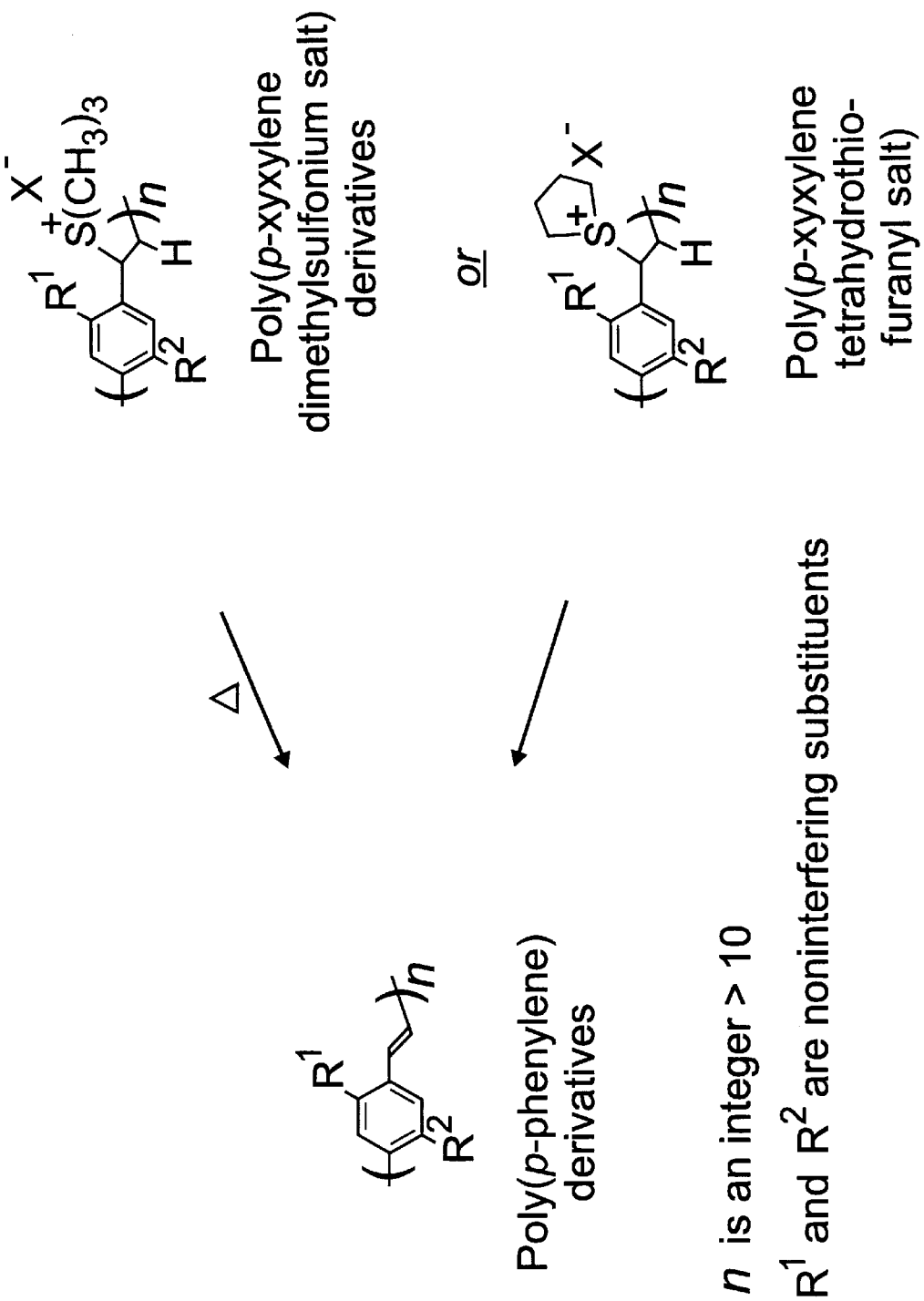

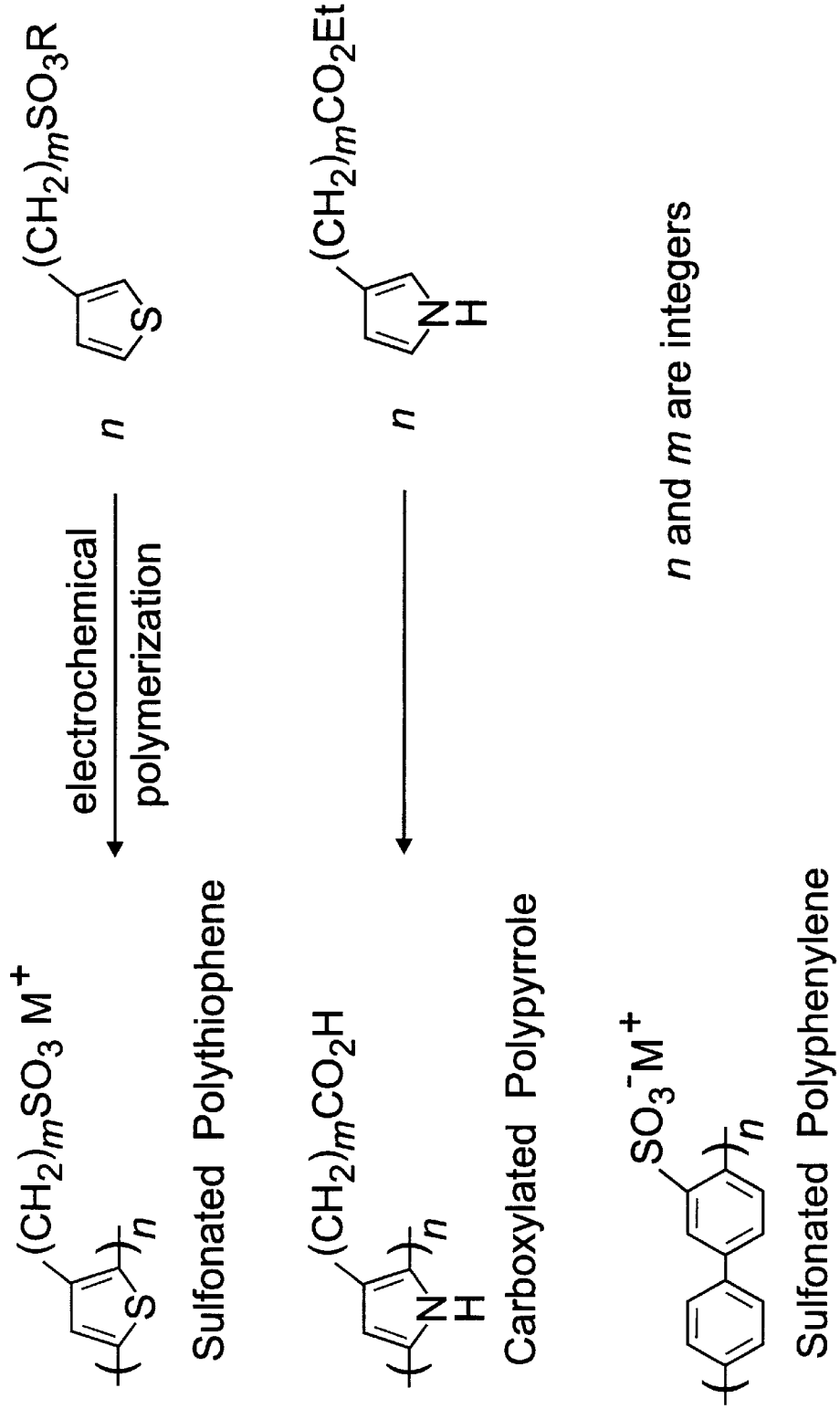

$^{29}$Si solid-state NMR spectrum of (a) a photopolymerized silica nanocomposite, and (b) a photocondensed TEOS reference sample.

HIGHLY ORDERED NANOCOMPOSITES VIA A MONOMER SELF-ASSEMBLY IN SITU CONDENSATION APPROACH

This invention was made with Government support under Contract No. DMR-9625433 awarded by the National Science Foundation and Contract No. N00014-96-1-0844 awarded by the Office of Naval Research, and Grant Number DE-AC03-76SF00098 from the Department of Energy. The Government has certain rights in this invention.

BACKGROUND OF THE INVENTION

Nanometer-scale architecture is frequently encountered in biological structural materials and is largely responsible for their impressive properties. See, Addadi, et al., *Angew. Chem. Int. Ed. Engl.* 31:153 (1992). Bone, for example, is comprised of 4 nm thick hydroxy apatite crystals grown within a regular collagen matrix. See, Heuer, et al., *Science* 255:1098 (1992); and Katz, et al., *Conn. Tissue Res.* 21:149 (1989). The construction of synthetic nanocomposites and materials with nanometer-scale domains has received considerable attention due in part to the desire to synthesize analogs to biological materials. See, Mark, et al., *Mater. Sci. Eng.* C1:159 (1994). Such nanocomposites are expected to possess unique properties similar to their biological counterparts as a result of their sophisticated nanoarchitectures.

Conventional processing techniques have been unable to achieve nanometer-scale architectural control in the fabrication of bulk, man-made materials. Thus, one of the goals in materials chemistry has been the development of methods for constructing synthetic composites with a degree of nanometer-scale organization similar to that in biological systems while retaining the ability to incorporate modern engineering materials. See, Heuer, et al., ibid. and Mark, et al., ibid. Several methods have recently been developed for controlling architecture and inducing anisotropy on the small scale in the design of synthetic organic-inorganic composites. For example, elongated ceramic particles have been precipitated within polymer matrices by drawing the polymer during the precipitation reaction (see Burdon, J.; Calvert, P. In *Hierachially Structured Materials*); silica (see, Kovar, R. F.; Lusignea, R. W., In *Ultrastructure Processing of Advanced Ceramics*) and CdS (see, Nelson, et al., *Mater. Sci. Eng.* C2:133 (1995)) have been precipitated in liquid-crystalline polymers; metals have been electrodeposited inside the pores of commercial nanopore membranes (see, Martin, *Chem. Mater.* 8:1739 (1996)); and polymers have been grown within the cavities of layered inorganic structures (see, Okada, et al., *Mater. Sci. Eng. C* C3(2):109 (1995)) and zeolites (see, Frisch, et al., *Chem. Mater.* 8:1735 (1996)). More recently, an organic-inorganic nanocomposite was formed by dissolving the inorganic polymer $(LiMo_3Se_3)_n$ in a conventional monomer acting as the solvent and then polymerizing the matrix in situ. See, Golden, et al., *Science* 273:5276 (1996). However, none of these methods are versatile enough to offer good control over both nanometer-scale architecture and composition for the facile synthesis of bulk materials.

What is needed in the art are new versatile strategies for constructing, ordered nanocomposites with well-defined tuneable nano-architectures and the ability to incorporate a wide variety of filler materials. The present invention provides such methods as well as nanometer-scale composite materials.

SUMMARY OF THE INVENTION

In one aspect, the present invention provides an ordered nanocomposite of a matrix component and a filler component. The matrix comprises polymerized inverse hexagonal phase-forming lyotropic liquid-crystalline monomers and defines a hexagonally-packed array of tubular channels. The filler component, which is contained in the tubular channels is a solid or semi-solid component which provides structural integrity or adds other beneficial properties to the nanocomposite. In one group of embodiments, the filler component is a conjugated organic polymer which is a photoluminescent or electroactive polymer. In other embodiments, the filler component is silica, alumina, magnetic ceramic particles, semiconductors, or metal salts. Optionally, the matrix of polymerized inverse hexagonal phase-forming monomers is prepared by polymerization of the monomers in the presence of crosslinkers. These composites can be formed into a variety of structures including fibers and films.

In another aspect, the present invention provides methods for the formation of nanocomposites comprising a matrix component of polymerized inverse hexagonal-forming lyotropic liquid-crystalline monomers and having hexagonally-packed tubular channels. The method comprises:

(a) combining a quantity of polymerizable inverse hexagonal-forming monomers, an aqueous or polar organic solvent, and channel filler precursor materials to form a pre-polymer mixture in which the polymerizable monomers adopt an inverse hexagonal phase around the aqueous or polar organic solution; and (b) polymerizing the pre-polymer mixture to form the nanocomposite matrix component having hexagonally-packed tubular channels.

In one group of embodiments, the methods will further comprise:

(c) reacting the channel filler precursor materials to provide channel fillers.

In yet another aspect, the present invention provides polymerizable, inverse hexagonal phase-forming lyotropic liquid crystalline monomers having the formula:

$$HG^1{-}T(X^1{-}PG^1)_n \qquad (I)$$

in which $HG^1$ represents a "hydrophilic" head group; T represents a bond or a template for the attachment of lipid tail groups, the template being an aromatic ring, monosaccharide, or polyhydroxylated lower alkyl group; each $X^1$ independently represents a hydrophobic lipid tail group having from 8 to 24 carbon atoms in a linear or branched chain and optionally interrupted by one or more heteroatom groups which can be —O—, —NH—, —NR—, and —S— wherein R is a lower alkyl or lower acyl group; each $PG^1$ is a polymerizable group; and n is an integer from 1 to 4.

In still another aspect, the present invention provides a matrix component which is formed by the polymerization of inverse hexagonal phase-forming lyotropic liquid-crystalline monomers.

indicative of a hexagonal phase.

FIGS. 8a and 8b illustrates several polymers (and precursors) which are useful as channel fillers.

Figure 9:
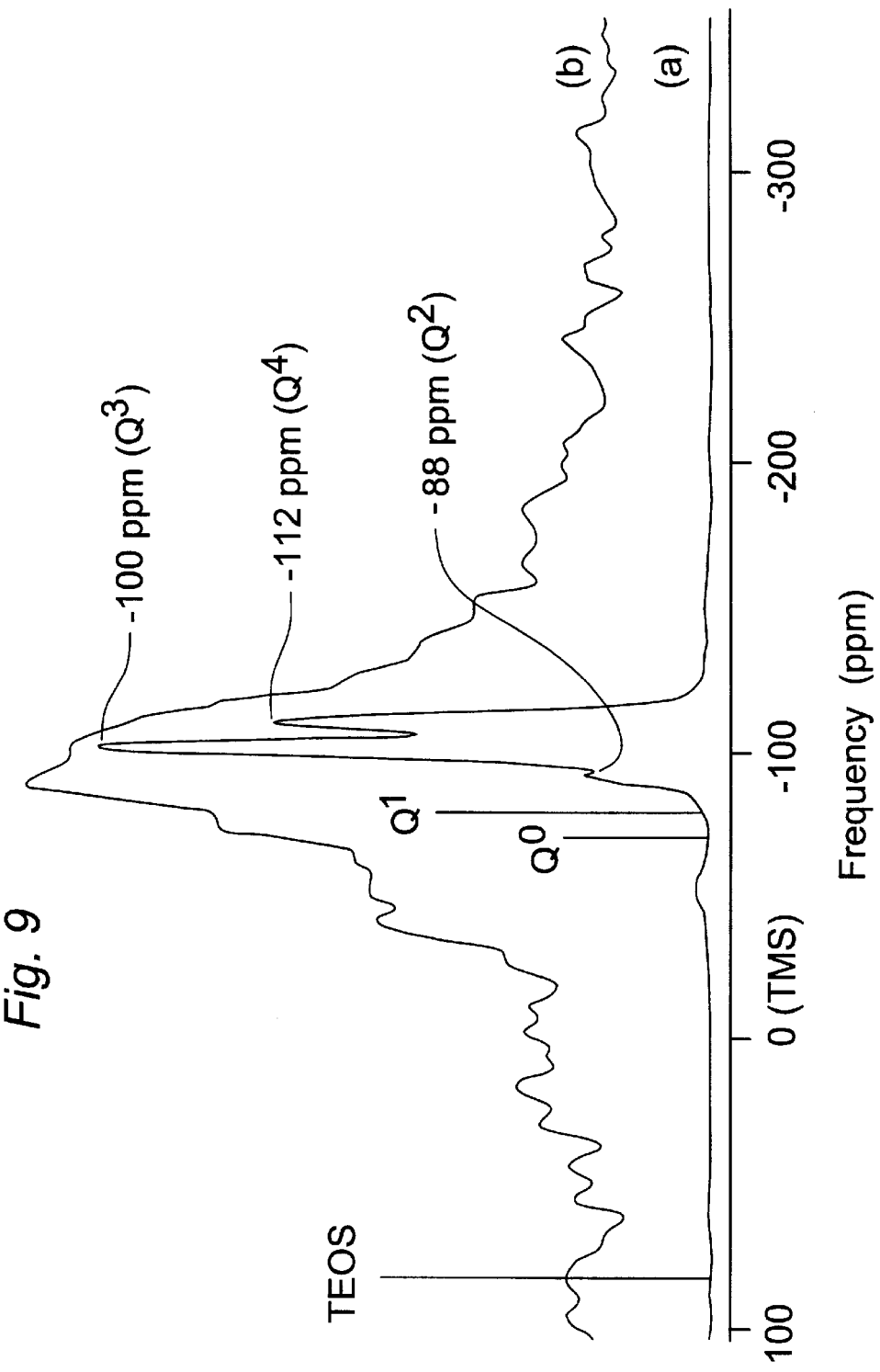

FIG. 9 illustrates $^{29}$Si solid-state NMR spectra of a nanocomposite which was used to verify the extent of condensation of TEOS within the matrix.

Figure 10:
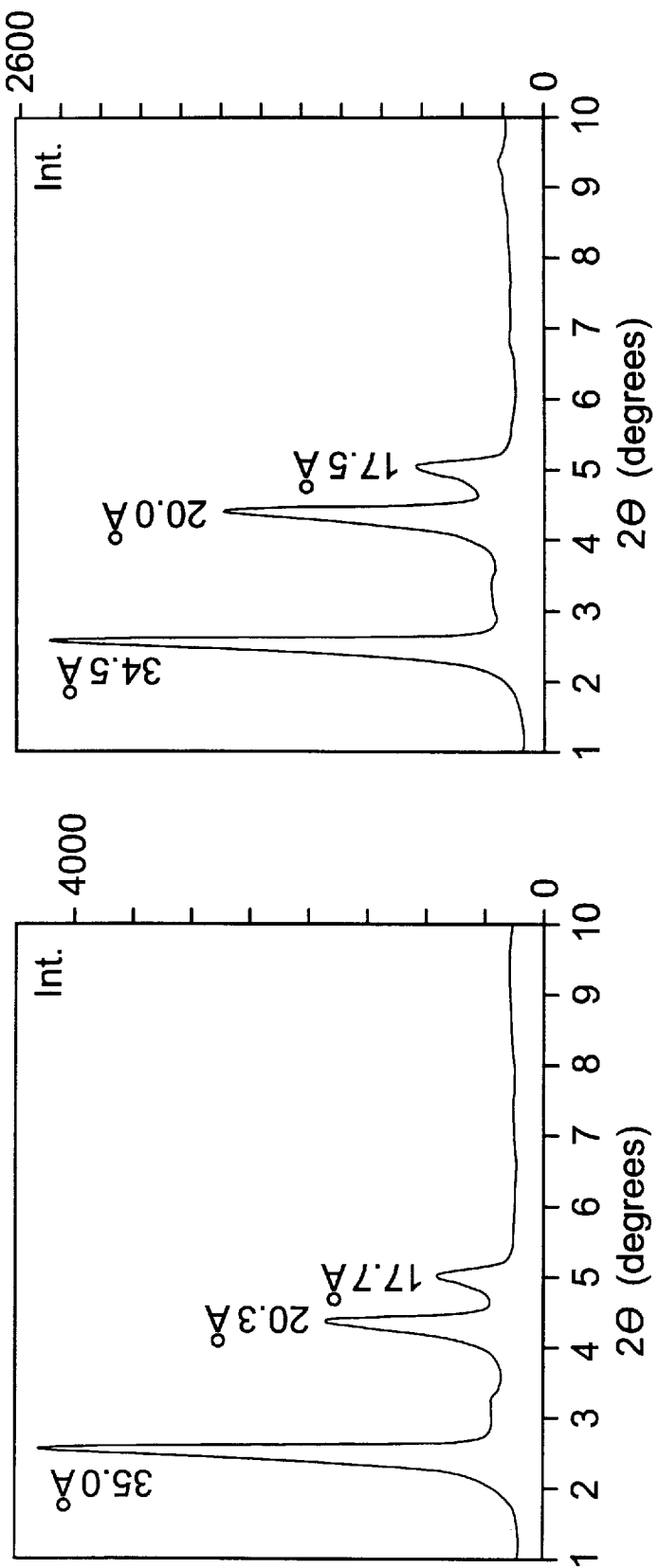

FIGS. 10(a)–10(b) illustrate low angle x-ray diffraction profiles of a mixture containing 80 wt % sodium 3,4,5-tris (11'-acryloyloxyundecyloxy)benzoate, 10 wt % aqueous PPV precursor solution, and 15 wt % of a p-xylene solution containing 2-hydroxy-2-methylpropriophenone: (a) before photopolymerization; and (b) after phtopolymerization.

Figure 11:
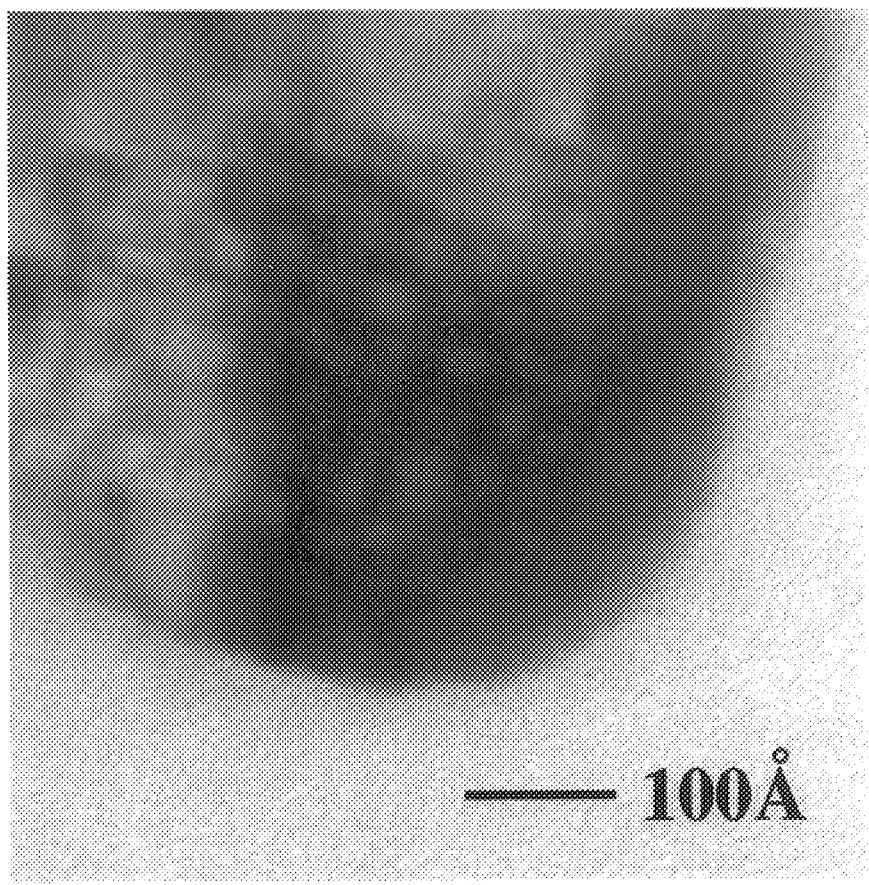

FIG. 11 provides the transmission electron microscopy (TEM) of a photopolymerized nanocomposite which illustrates the regular, hexagonal array of channels having an approximate diameter of 40 Å.

DETAILED DESCRIPTION OF THE INVENTION

Abbreviations and Definitions

As used herein, the term "composite" refers to a material composed of two or more distinct components. The components are present as a continuous matrix and a reinforcing structure. A composite is formed when two or more materials are combined with the intent of achieving better properties than can be achieved with a single, homogeneous material. The term "nanocomposite" refers to a composite in which the reinforcing structure has dimensions on the nanometer scale (e.g., 1 to 20 nanometer diameter rods).

As used herein, the term "critical packing parameter" refers to a value defined as the ratio of the volume occupied by the tail(s) of an amphiphilic molecule, divided by the product of the tail length and head group area.

The term "liquid-crystalline" refers to having fluid properties similar to that of a viscous liquid and a degree of molecular order reminiscent of a crystalline solid.

As used herein, the term "lyotropic liquid-crystalline monomers" refers to amphiphilic molecules that spontaneously self-assemble into fluid, yet highly ordered, matrices with regular geometries of nanometer-scale dimension. As used in the present invention, the lyotropic liquid-crystalline monomers are used to form an inverse hexagonal phase around hydrophilic solutions containing, for example, precursors to inorganic solid state materials or organic polymers.

General

The present invention provides new composite materials and methods for the synthesis of composite materials with architectural control on the nanometer scale. The broad concept of the invention is illustrated in FIG. 1.

Figure 1:
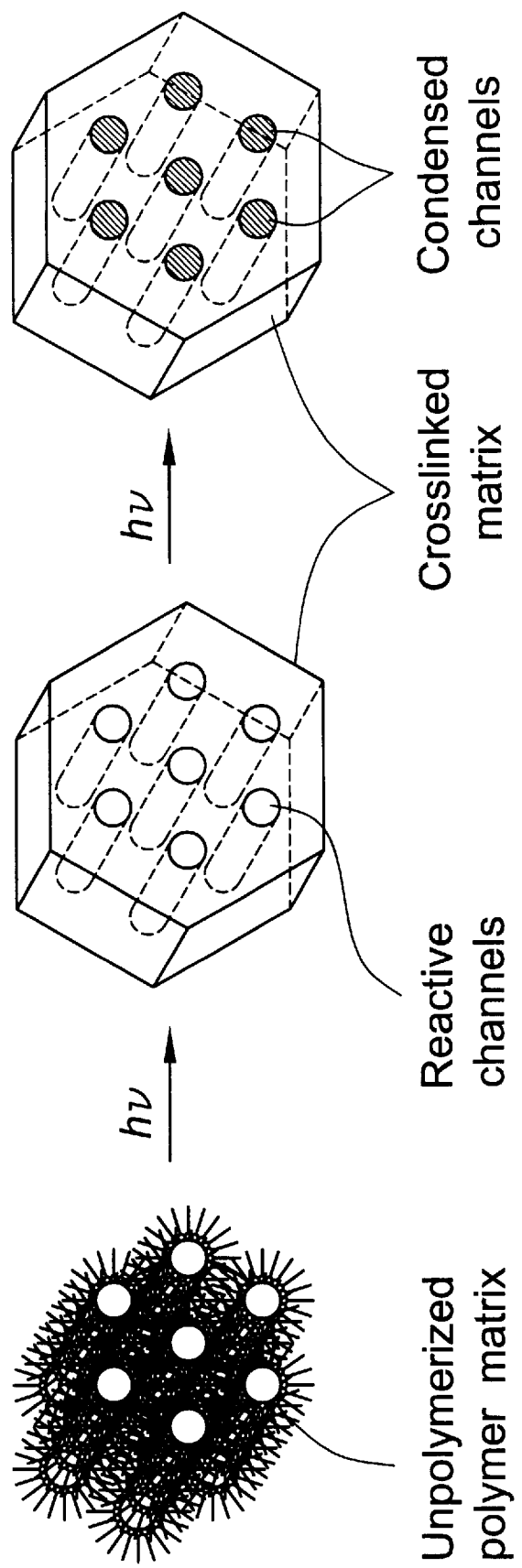
FIG. 1 illustrates the broad concept of the nanocomposites of the present invention.

According to FIG. 1, nanocomposites can be prepared by first forming an inverse hexagonal phase of a suitable polymerizable lyotropic liquid-crystalline monomer in the presence of a solution containing reactive agents (A). Polymerization of the lyotropic liquid-crystalline monomers serves to lock-in the matrix architecture (B) which consists of a rigid framework defining hexagonally packed tubular channels. Subsequent initiation of chemistry within the resulting hexagonally packed channels can be carried out to provide a solidified channel filler and thereby yield the final composite material (C).

Thus, in one aspect, the present invention provides an ordered nanocomposite. The composite has a matrix component and a filler component. The matrix component defines tubular hexagonally-packed channels and is prepared by the polymerization of inverse hexagonal-forming lyotropic liquid-crystalline monomers. The filler component is a second material which can be reacted or polymerized into a solid or semi-solid form to fill the tubular hexagonally-packed channels.

The lyotropic liquid-crystalline monomer system acts as an organic template, providing the underlying order of the composite system. Polymerization of the template, optionally in the presence of a cross-linking agent, with retention of the liquid-crystalline order can be confirmed using low-angle x-ray diffraction spectroscopy and polarized light microscopy. Subsequent initiation of chemistry within the resulting, ordered hydrophilic domains, yields an anisotropic nanocomposite.

Although the polymerization of reactive amphiphiles in bilayer films and vesicles is well established (see, Ringsdorf, et al., *Angew. Chem. Int. Ed. Engl.* 27:113 (1988)), the successful in situ polymerization of the inverse hexagonal phase in pure water with retention of phase architecture has only been reported twice. See, Herz, et al., *J. Polym. Sci., Part C* 4:1275 (1963) and Lee, et al., *J. Am. Chem. Soc.* 117:5573 (1995). In another report, polymerization of lyotropic liquid-crystalline phases often proceeds with a change in the phase microstructure (see, Friberg, et al., *Science* 205:607 (1979)). None of these reports considered the development of additional chemistry within the matrix channels to form integrated composite structures.

Described herein are composites with tailored small-scale architectures. In brief, these nanocomposites are formed by the polymerization of inverse hexagonal phase-forming monomers. The polymerization is optionally carried out in the presence of a crosslinker to add greater structural integrity to the composite matrix. Additionally, the polymerization is carried out in a solution which contains reactive precursors to a channel filler material. The precursors can be selected to provide a variety of properties to the composite. Depending on the nature of the precursor materials, the channel filler component will be formed during the polymerization of the matrix, or alternatively, after the matrix has been formed.

Inverse Hexagonal Phase-Forming Monomers

Figure 2:
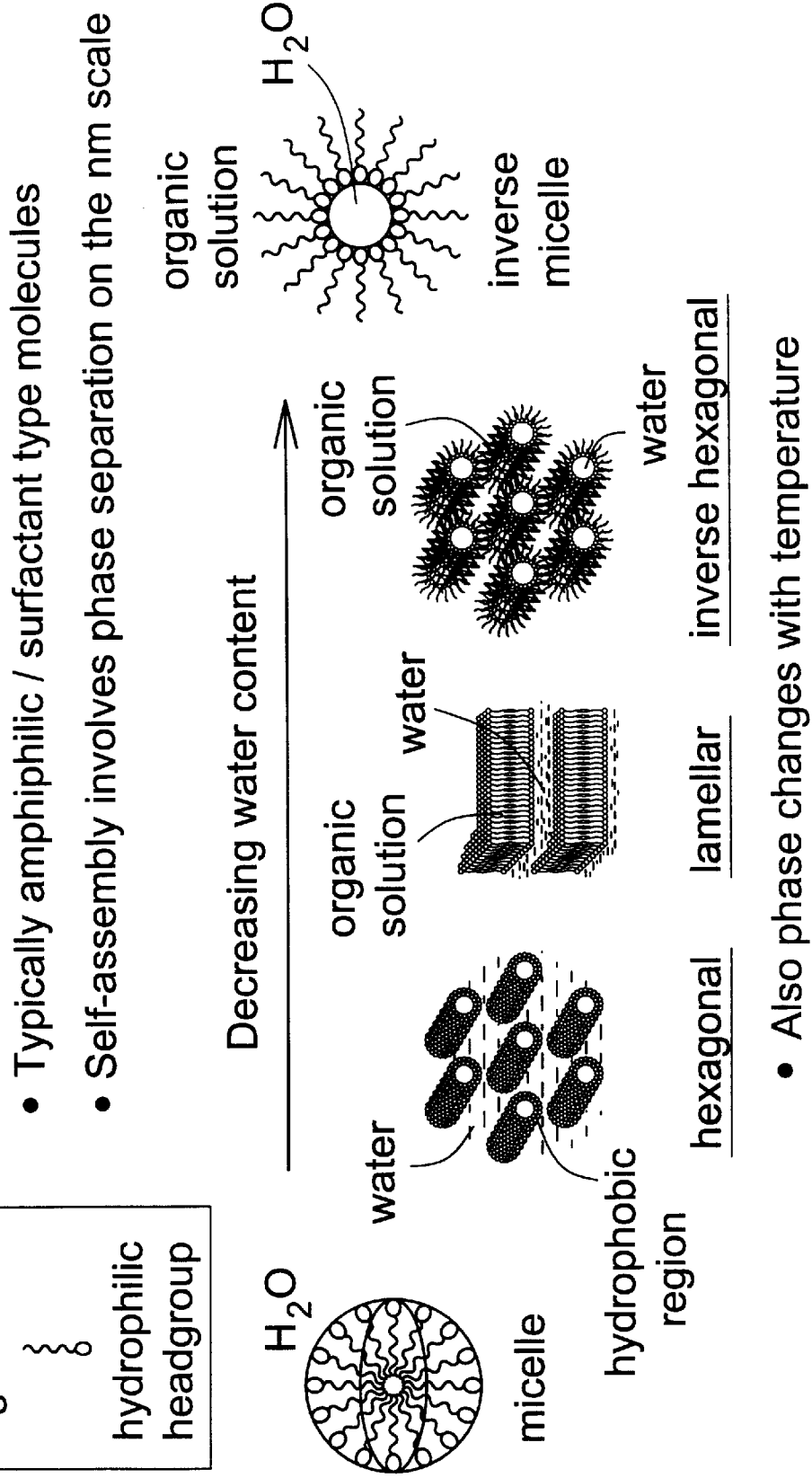
FIGS. 2–4 illustrate the structural motifs for an inverse hexagonal phase-forming liquid-crystalline monomer.

The lyotropic liquid-crystalline monomers which are useful for forming the composites and matrices of the present invention are inverse hexagonal phase-forming monomers. These monomers will spontaneously self-assemble into fluid, yet highly ordered, matrices with inverse hexagonal phase geometries as depicted in FIG. 2. Confirmation of the inverse hexagonal geometry can be made by polarized light spectroscopy or low angle x-ray diffraction.

Figure 3:
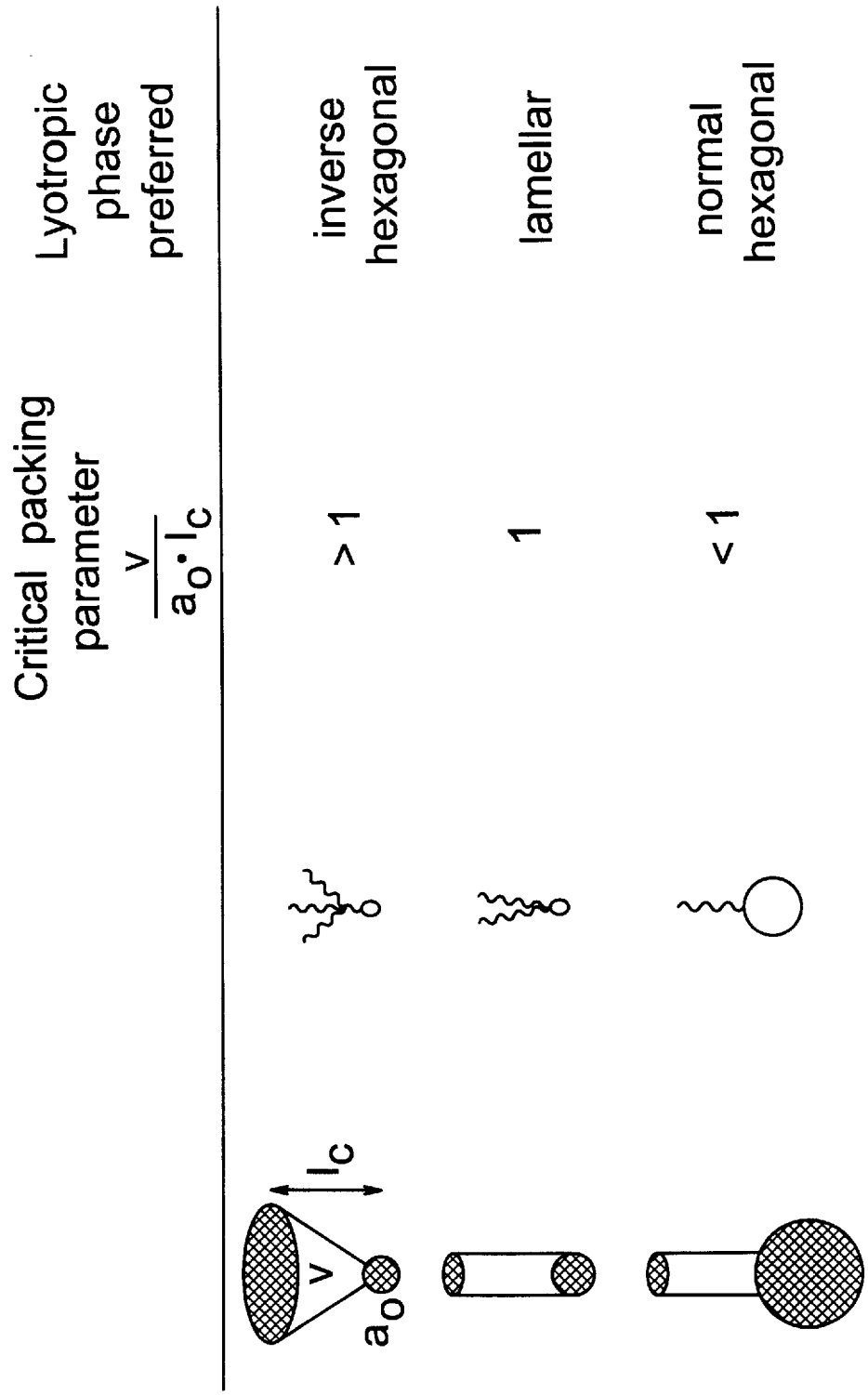
Figure 4:
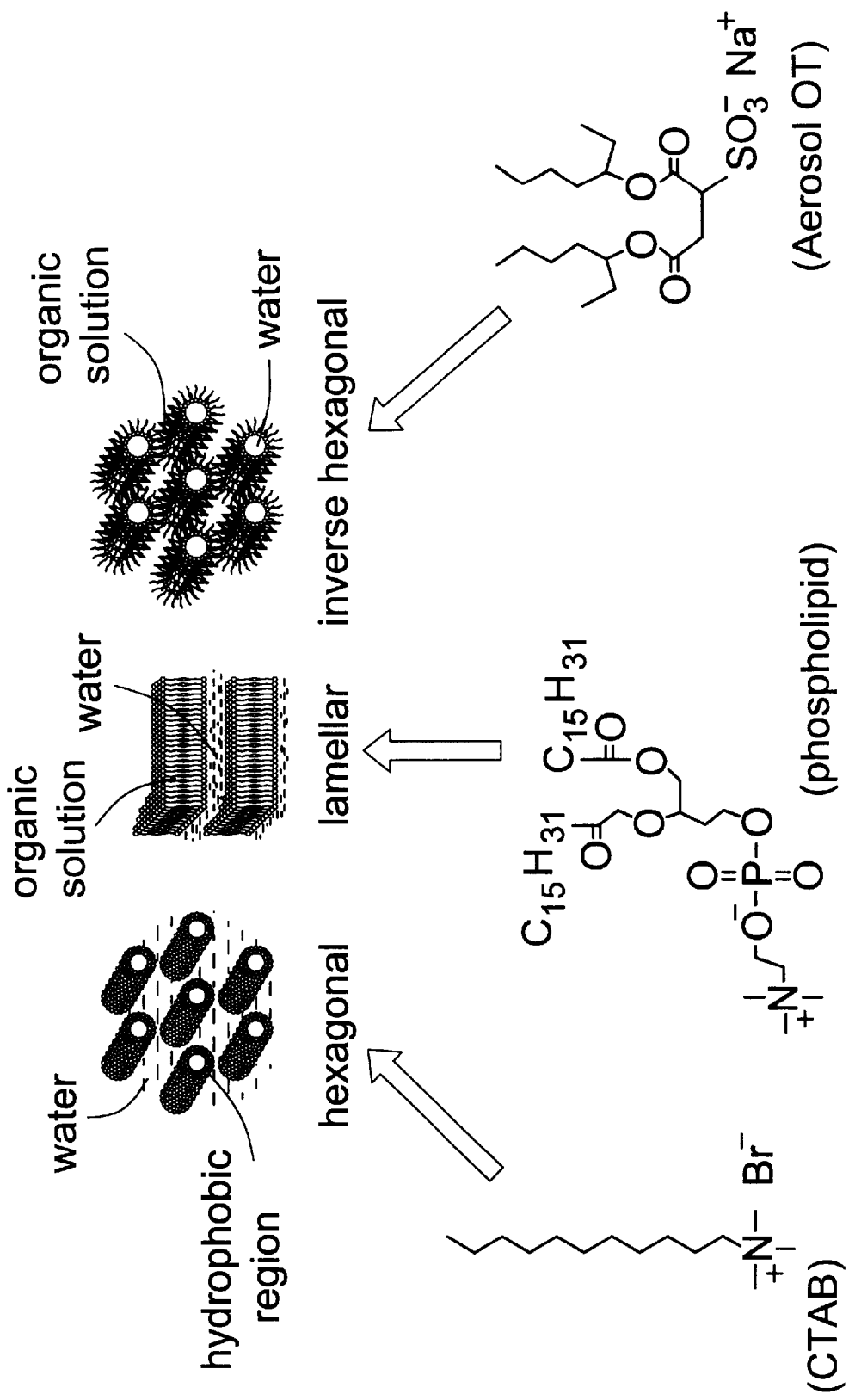

A structural motif for common lyotropic liquid-crystalline monomers is a broad hydrophobic tail and a small hydrophilic headgroup (see FIG. 3). As can be seen in FIG. 3, the phase preferred by a particular monomers is related to the critical packing parameter of the monomer. The critical packing parameter is a function of the effective area of space occupied by the hydrophilic head group (e.g., a phosphatidylcholine group in certain phospholipids) and length of the lipid tails, relative to the volume of space occupied by the lipid tail groups. Lamellar phases (see FIG. 2) such as those found in liposomes, are formed from monomers (e.g., phospholipids) in which the critical packing parameter is about 1. Normal hexagonal phases are formed from monomers in which the volume of space occupied by the polar head group is larger than that occupied by the tail group. Because of this aspect ratio, normal hexagonal phase monomers will assemble into hexagonally packed cylindrical arrays in which each of the cylinders is filled with the hydrophobic tail groups of the monomers and the cylinder surface comprises the hydrophilic head groups. Inverse hexagonal phases are formed from monomers in which the volume of space occupied by the hydrophobic tail group is larger than the volume of space occupied by the polar head group. Inverse hexagonal phase-forming monomers will spontaneously assemble into hexagonally packed tubular channels in which the hydrophilic head groups are oriented toward the center of the tube or cylinder axis and the hydrophobic tail portions extend outward. As indicated in FIGS. 3 and 4, amphiphiles which are inverse hexagonal phase-forming monomers will typically have some branching in the hydrophobic tail group. In preferred embodiments, the inverse hexagonal phase-forming monomers will have a critical packing parameter of greater than 2.

One group of inverse hexagonal phase-forming monomers which are useful in the present invention are those monomers having the formula:

$$HG^1 - T - (X^1 - PG^1)_n \qquad (I)$$

In this formula, $HG^1$ represents a hydrophilic head group, preferably a charged hydrophilic head group. The letter T represents a bond or a template for the attachment of lipid tail groups. Suitable templates include, for example, aromatic rings, monosaccharides, and polyhydroxylated lower alkyl groups. Attached to either T or $HG^1$ (when T is a bond) are $X^1$ groups which are the same or different from each other and independently represent a lipid tail group having from 8 to 24 carbon atoms in a linear or branched chain, optionally interrupted by one or more heteroatom groups such as —O—, —NH—, —NR—, and —S— wherein R is a lower alkyl or lower acyl group. Each $PG^1$ is hydrogen or a polymerizable group, preferably a polymerizable group. Suitable polymerizable groups are those which will undergo radically initiated polymerizations such as acrylates, methacrylates, acrylonitrile, methacrylonitrile, ethylenes, styrenes (including α-methyl styrenes), halogenated olefins, vinyl esters, 1,3-dienes, acrylamides, methacrylamides, N-vinyl carbazoles, and N-vinyl pyrrolidines. Preferably, the polymerizable groups are acrylates, methacrylates, acrylonitrile, methacrylonitrile, styrenes (including α-methyl styrenes), vinyl esters, 1,3-dienes, and acrylamides. In the above formula, the letter n represents an integer of from 1 to 4. When n is greater than 1, each $X^1$ and $PG^1$ can be independent of the others. For example, when n is 3, each of the $X^1$ groups can be different and each $PG^1$ will be independently a hydrogen or polymerizable group. Preferably at least two of the three $PG^1$ groups are polymerizable groups.

Figure 5:
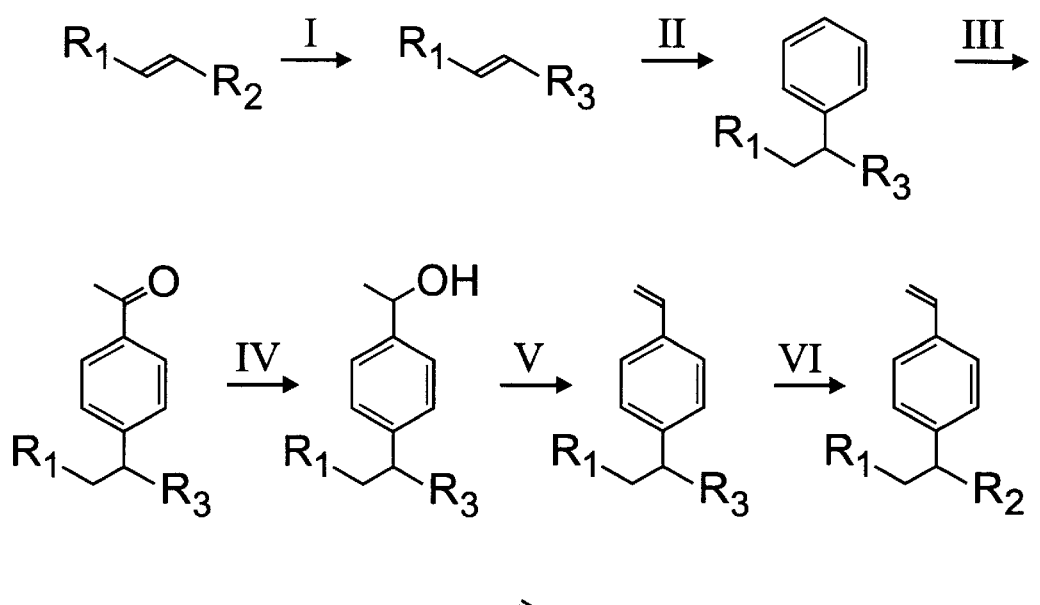
FIG. 5 illustrates the synthesis of sodium p-styryloctadecanoate as one example of a polymerizable inverse hexagonal phase-forming liquid-crystalline monomer.
Figure 6:
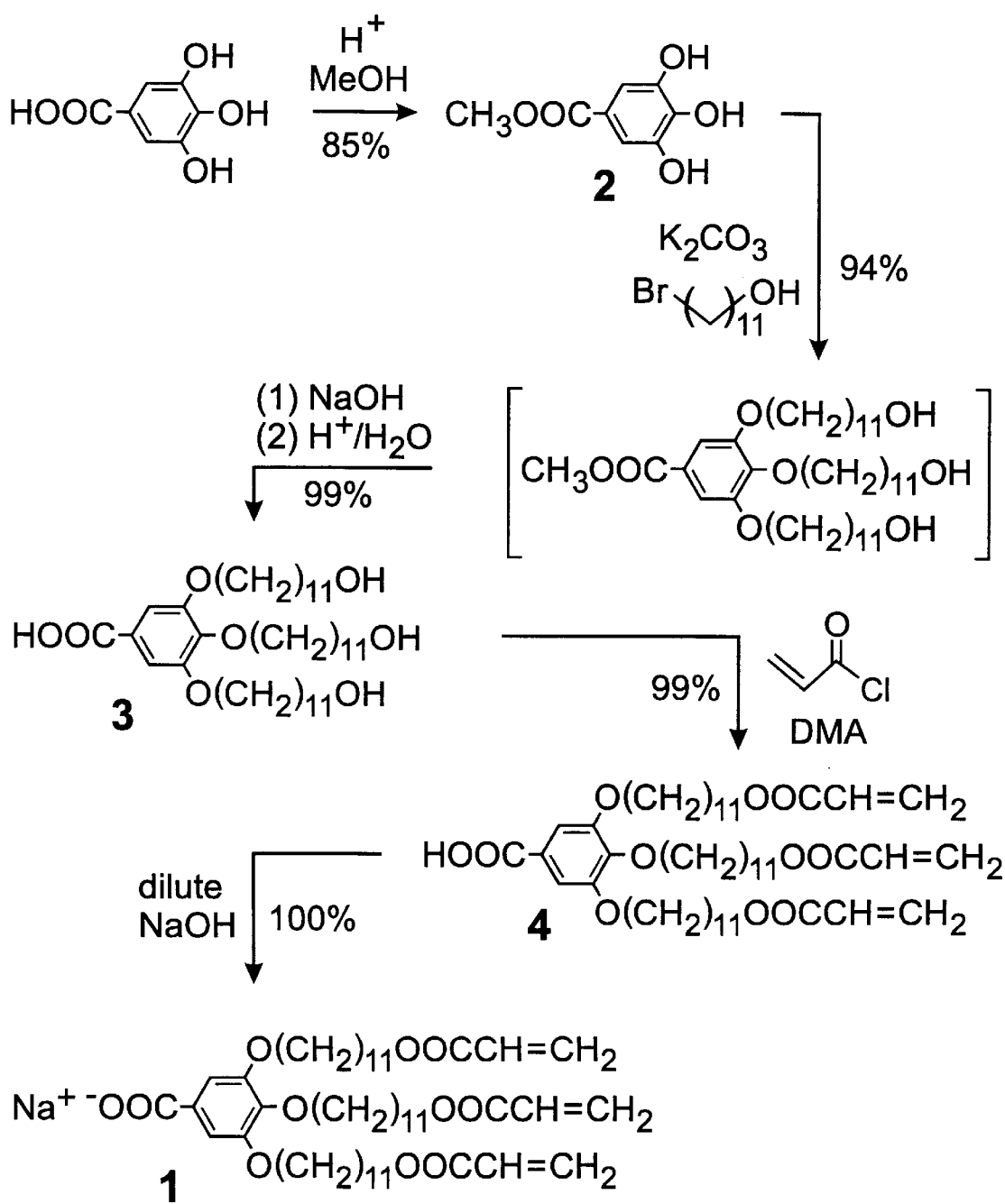
FIG. 6 illustrates the synthesis of sodium 3,4,5-tris(11'-acryloyloxyundecyloxy)benzoate as a second example of a polymerizable inverse hexagonal phase-forming liquid-crystalline monomer.

The preparation of two representative inverse hexagonal phase-forming monomers is depicted in FIGS. 5 and 6, with experimental conditions provided in the examples below. In FIG. 5, a monomer is prepared having the formula above in which T is a bond. The polar head group, $HG^1$, is a carboxylate salt (—$CO_2^-Na^+$). Additionally, $X^1$ is a long chain alkyl group (heptadecyl straight chain) and $PG^1$ is a p-styryl group which is attached to the $X^1$ chain at a position which provides branching and results in an inverse hexagonal phase-forming monomer. According to the synthesis scheme in FIG. 5, the hydrophobic chain of the monomer can be "branched" by the addition of a polymerizable group (or precursor to a polymerizable group) at a non-terminal carbon atom of the chain. The target 1 monomer is a polymerizable styrene analog of lithium stearate, a molecule which is known to adopt the inverse hexagonal phase. See, Harrison, et al., *J. Phys. Chem.* 95:4136 (1991). The monomer is prepared from the Friedel-Crafts reaction of benzene with methyl oleate, generating a mixture of regio-iosmers. See, Smith, et al., *J. Org. Chem.* 30:885 (1965). Acylation of the phenyl ring with acetyl chloride, reduction of the ketone to the corresponding, benzyl alcohol, and dehydration forms the styryl moiety. Saponification of the styryloctadecanoate ester, followed by neutralization with sodium hydroxide, yields the desired monomer. See, Freedman, et al., *J. Org. Chem.* 23:76 (1958). Initial phase characterization studies revealed that mixtures of this monomer containing small amounts of a crosslinker (ca. 5–10 wt %), an organic photoinitiator (ca. 2 wt %), and water (2–20 wt %) form a well-defined inverse hexagonal phase, as confirmed by polarized light microscopy and low angle x-ray diffraction. The optical textures of these mixtures are consistent with those of other hexagonal phases encountered in the literature. See, Ekwall, in ADVANCES IN LIQUID CRYSTALS, Brown, ed., Volume 1, Academic Press, New York (1975), Chapter 1.

Analogs related to the monomer of FIG. 5 can be prepared by methods well known to one of skill in the art. In particular, other suitable starting materials (unsaturated fatty acids) could be used in place of methyl oleate. Additionally, an olefin moiety present in the unsaturated fatty acid starting material can be derivatized to add functional groups such as hydroxyl groups, amino groups and the like (see March, ADVANCED ORGANIC CHEMISTRY, 4TH ED. Wiley-Interscience, New York, N.Y., (1992), incorporated herein by reference). Suitable polymerizable groups other than styrene can then be attached to the added functional groups to provide monomers according to the formula above.

FIG. 6 illustrates the preparation of a monomer in which T is a template for the attachment of lipid tail groups. More particularly, the template is an aromatic ring (e.g., phenyl) having three hydroxyl groups attached at the 3-, 4- and 5-positions of the ring relative to the head group. The polar head group, $HG^1$, is a carboxylate salt (—$CO_2^-Na^+$). $X^1$ is a long chain alkyl group (undecyl straight chain) which terminates in a hydroxy group for the attachment of polymerizable groups. In this instance, the polymerizable groups ($PG^1$) are each an acrylate group. The preparation of this monomer begins by coupling methyl gallate with three equivalents of 11-bromoundecan-1-ol to form the basic platform of the amphiphile. Saponification of the ester, followed by acrylation of the terminal hydroxy groups generates the acid form of the desired monomer. Neutralization with NaOH affords pure monomer as the sodium salt.

As above, application of standard synthetic methods can be used to prepare other monomers according to the formula. For example, other templates for the attachment of lipid tail groups can be used such as monosaccharides and polyhydroxylated lower alkyl groups (e.g., glycols, 1,2,4-butanetriol). Still other templates can be used provided appropriate functionality is present for the attachment of lipid tail groups. Other examples include spermine and spermidine which have multiple amino groups. Reaction of amino groups with fatty acid alkyl groups terminating in isocyanate, isothiocyanate, and acid chloride groups provides covalent attachment of the lipid tail groups through urea, thiourea, and amide linkages. Alternatively, the amine groups can also be reacted with ω-bromoalkanols (e.g., 11-bromoundecanol and related bromoalcohols) to introduce lipid tail groups having functionality for the attachment of polymerizable groups.

As noted above, suitable polymerizable groups are those which can be polymerized via radical-induced processes. Examples of such groups include acrylates, methacrylates, acrylonitrile, methacrylonitrile, styrenes (including α-methyl styrenes), vinyl esters, 1,3-dienes, and acrylamides. One of skill in the art will understand that appropriate selection of a polymerizable group will be governed primarily by synthesis considerations. For example, lipid tail groups which contain a hydroxyl group for the attachment of polymerizable groups can be reacted with acryloyl chloride or methacryloyl chloride to attach acrylate and methacrylate groups, respectively. Alternatively, the hydroxyl groups can be derivatized to append a styrene moiety via acylation with 4-vinylbenzoic acid or alkylation with vinylbenzylchloride. Similarly, reaction of acryloyl chloride or methacryloyl chloride with a polyamine template (e.g., spermine or spermidine) will result in covalent attachment of acryl and methacryl groups to produce acrylamides and methacrylamides.

Figure 7:
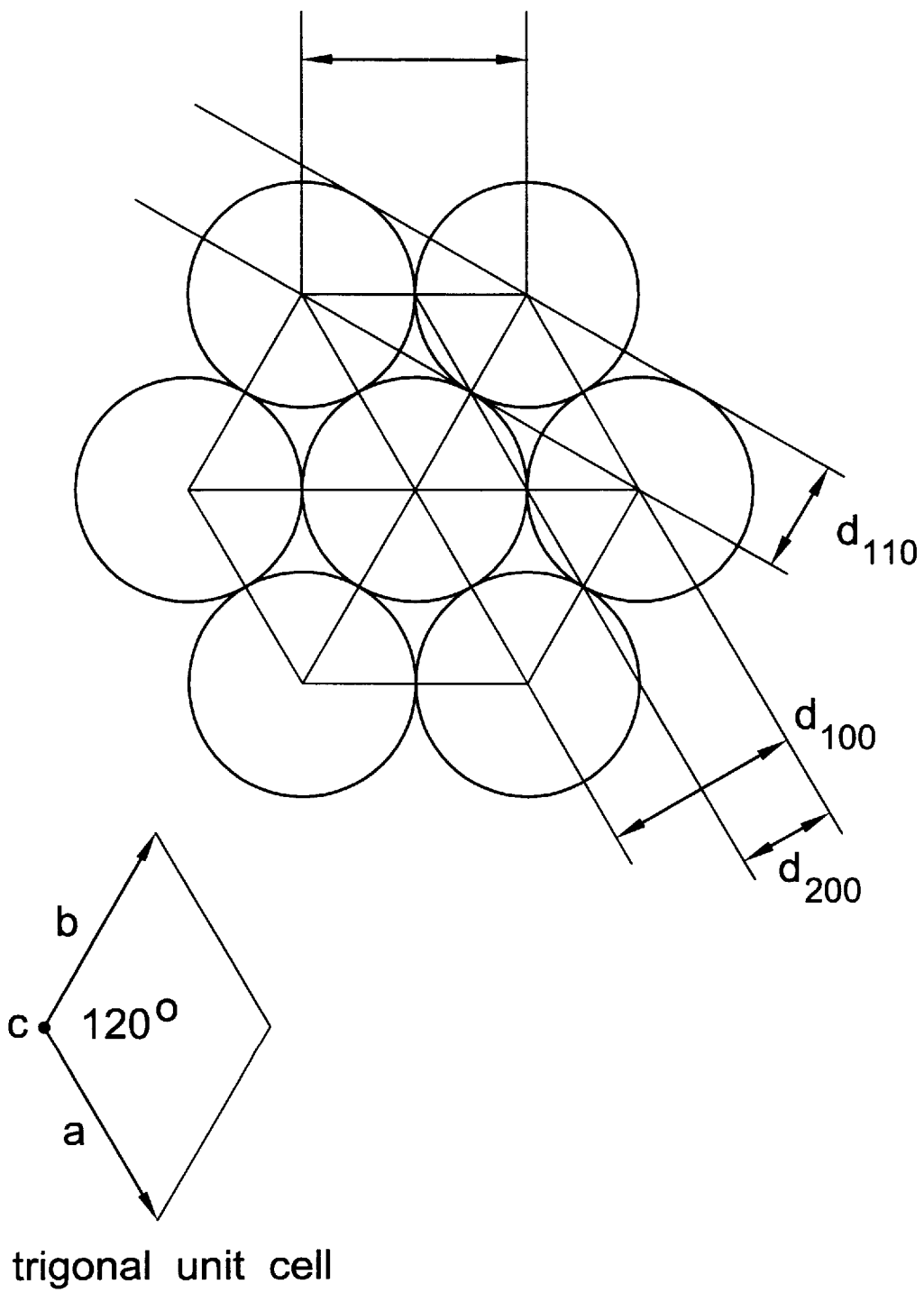
FIG. 7 illustrates an x-ray diffraction profile of a polymerized mixture which exhibits x-ray diffraction d spacings with ratios of $$1 : \frac{1}{\sqrt{3}} : \frac{1}{\sqrt{4}} : \frac{1}{\sqrt{7}} : \frac{1}{\sqrt{9}} : \frac{1}{\sqrt{12}} \ldots$$

Once the monomers have been prepared, evaluation for the formation of an inverse hexagonal phase can be accomplished by standard methods. Typically, a mixture of 80 wt % of the monomer, 10 wt % of an aqueous solution, and 10 wt % of a organic solution containing a photoinitiator, can be examined for the formation of a well-defined, stable inverse hexagonal phase at ambient temperature. The optical texture of this mixture under the polarized light microscope should be consistent with that of a lyotropic inverse hexagonal mesophase. Reviews of lyotropic liquid-crystalline compounds can also be found in Winsor, in LIQUID CRYSTALS AND PLASTIC CRYSTALS, Gray, et al., eds. Volume 1, Ellis Horwood, Chichester (1974), Chapter 5; Ekwall, in ADVANCES IN LIQUID CRYSTALS, Brown, ed., Volume 1, Academic Press, New York (1975), Chapter 1; and Tiddy, *Phys. Rep.* 57:1 (1980), the disclosures of each being incorporated herein by reference. The x-ray diffraction profile of the polymerized mixture should exhibit d spacings with ratios of $$1 : \frac{1}{\sqrt{3}} : \frac{1}{\sqrt{4}} : \frac{1}{\sqrt{7}} : \frac{1}{\sqrt{9}} : \frac{1}{\sqrt{12}} \ldots$$

indicative of a hexagonal phase (FIG. 7). See, Ekwall, supra. These peaks correspond to the $d_{100}$, $d_{110}$, $d_{200}$, ... diffraction peaks, respectively. See, Behrens, et al., *Angew. Chem. Int. Ed. Engl.* 32:696 (1993). Up to about 20 wt % aqueous solution can usually be incorporated with retention of the inverse hexagonal architecture.

Channel Fillers

For formation of the composites described herein, the hexagonally packed tubular channels are filled with reagents which can provide further structural integrity to the nanocomposite. Alternatively, some channel fillers will provide other properties, such as photoluminescence. The channel fillers will typically be present as precursor materials during the formation of the matrix. Once the matrix is established, the channel filler monomers or reactants can be converted to a component which lends structural integrity to the composite or other beneficial properties. Alternatively, the channel filler monomers can be polymerized coincidentally with the polymerization of the inverse hexagonal phase monomers. A variety of channel fillers are useful for the formation of the present nanocomposites.

In one group of embodiments, the channels fillers are compositions which add structural integrity to the composite. Illustrative of such fillers is sol-gel silica which is prepared from a solution of tetraethylorthosilcate (TEOS). Other sol-gel glasses are also useful such as aluminophosphates, alumino-silicates, or zirconia-, chromium- or titanium-silicates. Still other channel fillers or precursor materials would include magnetic ceramic particles or alumina.

In another group of embodiments, the channels fillers are compositions which add other beneficial properties to the composite. Illustrative of such fillers are semiconductors, metal salts, metal particles and conjugated organic polymers. A variety of organic semiconductors can be utilized as channel fillers and can be prepared from such precursors as poly(p-xyxlenetetrahydrothiofuranyl salts) or poly(p-xyxylenedimethylsulfonium salt) derivatives (see FIGS. 8a and 8b). The organic semiconducting polymers are insoluble in aqueous based solutions and must be formed in the channels from soluble precursors. Metal salts useful as channel fillers will include semiconductors (e.g., CdS, $TiO_2$, $Cu_2S$, HgS, CdSe, ZnS, PdS and $In_2S_3$), magnetic particles (e.g., $Fe_3O_4$), and reinforcing salts (e.g., $Ag_2O$, $Fe_2O_3$, $Ca_3(PO_4)_2$, $CaCO_3$, $CaSO_4$, and CuO). Metal particles which can be used as channel fillers are those which are suitable for catalyzing certain organic reactions and will include, for example, Pt, Pd, Rh, Ir and Au. Deposition of these metal particles in a channel can be accomplished by photolysis of soluble precursor species. See, for example, Fendler, *Chem. Rev.* 87:877 (1987), incorporated herein by reference.

In still other embodiments, a series of water-soluble conjugated polymers can be incorporated into the channels during formation of the matrix. As the polymers are water-soluble, no additional conversion to channel filler materials is necessary. Examples of water-soluble conjugated polymers include sulfonated polythiophene, carboxylated polypyrrole, and sulfonated polyphenylene (see FIGS. 8a and 8b).

Methods of Preparing Nanocomposites

In another aspect, the present invention provides methods of forming an ordered nanocomposite matrix comprising polymerized inverse hexagonal-forming lyotropic liquid-crystalline monomers and having hexagonally-packed tubular channels. These methods comprise:

(a) combining a quantity of polymerizable inverse hexagonal-forming monomers, an aqueous or polar organic solvent, and channel filler precursor materials to form a pre-polymer mixture in which the polymerizable monomers spontaneously adopt an inverse hexagonal phase around the aqueous or polar organic solution; and (b) polymerizing the pre-polymer mixture to form the nanocomposite matrix having hexagonally-packed tubular channels. The channels formed are filled with the aqueous or polar organic solution containing the channel filler precursor materials.

Accordingly, in one group of embodiments, the present inventive methods will further comprise:

(c) reacting the channel filler precursor materials to provide channel fillers.

The inverse hexagonal-forming monomers which are useful in this aspect of the invention are those which have been described above. These monomers can be combined with an aqueous or polar organic solution and channel filler precursor materials to form a pre-polymer mixture. The order in which the monomers, solvent and precursors are combined can vary.

Solvents which are useful in the present inventive methods include water, polar organic solvents and combinations thereof. Examples of suitable polar organic solvents include acetonitrile, DMF, DMSO, sulfolane, and THF. Preferably, the polar organic solvent is acetonitrile or THF.

The channel filler precursor materials are essentially those which have been described above.

As noted, additional components (e.g., crosslinkers and radical initiators) can be present in the pre-polymer mixture. The use of a crosslinker is preferred for those embodiments in which the inverse hexagonal phase-forming monomer contains a single polymerizable group. A number of crosslinkers are useful in the present invention and include divinylbenzene, N,N-bis-acrylamide, ethylene glycol dimethacrylate, and ethylene glycol diacrylate.

In order to facilitate the polymerization processes which form the matrix and, in some embodiments, the channel filler, a radical initiator will optionally be present in the pre-polymer mixture. Suitable radical initiators or those which will form radical species upon exposure to light or heat. Examples of radical photoinitiators include 2-hydroxy-2-methylpropiophenone, 2,2-dimethoxy-2-2-phenylacetaphenone, 4,4'-dihydroxy benzophenone. Suitable initiators which are heat activated include essentially any organic peroxide or azo compound (e.g., benzoyl peroxide, azobis(isobutyronitrile), and t-butylperoxide).

The quantities of each of the components should be amounts which will not disrupt or interfere with the ability of the inverse hexagonal-forming monomers to adopt an inverse hexagonal phase around the aqueous or polar organic solutions. The amount of each component will vary if additional components, for example, crosslinkers and radical initiators, are added to or otherwise present in the pre-polymer mixture. Typically, the amount of inverse hexagonal-forming monomers in the pre-polymer mixture will be on the order of 60 to 95 weight % (wt %), preferably about 70 to 90 wt %, more preferably about 75 to 85 wt %.

Amounts of the aqueous or polar organic solutions will typically be about 5 to about 20 wt %, preferably about 7 to about 15 wt %. The aqueous or polar organic solution will optionally contain an amount of a channel filler precursor material which is sufficient to produce the desired nanocomposite. In one group of embodiments, an aqueous solution is prepared containing from 0.1 to 10 wt % (relative to the aqueous solution) of an organic polymer which is a conjugated photoluminescent polymer. Crosslinkers, when present, will typically be present in an amount of from 2 to 30 wt %, preferably about 10 to about 20 wt %. Radical initiators, when present, will typically be present in an amount of from about 0.5 to about 5 wt %, preferably about 1 to 3 wt %.

Once the components of the pre-polymer mixture have been combined and an inverse hexagonal phase has been formed, the matrix architecture can be "locked in" by polymerizing the inverse hexagonal phase-forming monomers. Methods which are useful for initiating the monomer polymerization include both applying light (e.g., ultraviolet light) and heat. Preferably, the polymerization is performed with ultraviolet light of a suitable wavelength either in bulk or in thin films. Confirmation of the inverse hexagonal matrix architecture can be established by transmission electron microscopy and x-ray diffraction. The polymerized material will typically contain a regular, hexagonal array of channels, each of the channels having a diameter of about 2 to about 10 nanometers. The size of the channel can be established by altering the composition of the pre-polymer mixture or the structure of the liquid-crystalline monomer.

In preferred embodiments, the channels have diameters of from about 3 to about 6 nanometers. Components of the pre-polymer mixture which are not polymerized in the formation of the matrix are typically present in the channels as part of an aqueous or polar organic solution.

Completion of nanocomposite formation is carried out by reacting the channel filler precursor materials to provide channel fillers. Examples of channel fillers have been provided above. Depending on the channel filler precursor materials, the channel filler can be formed using any of the conventional polymerization techniques known to those of skill in the art. For example, polymerization of channel filler precursor materials can be accomplished with acid catalysis, heat, light, or combinations thereof. As provided in the examples below, a channel filler precursor material such as TEOS can be polymerized by acid catalysis when the "acid" is present in the channels as a photoacid (e.g., a light-induced acid generator). PPV is formed by using a water-soluble precursor polymer such as poly (p-xyxylenedimethylsulfonium chloride) as the channel filler precursor material and heating the precursor to yield PPV upon elimination. Ceramic particles and salts can be formed by using a water-soluble solution of the cation to form the initial inverse hexagonal phase, and then diffusing in a gaseous or aqueous reagent to react and form an insoluble filler material in the channels (e.g., 3 $Ca^{2+}$, 6 $Cl^-$ and 2 $K_3PO_4$ provides 6 KCl and $Ca_3(PO_4)_2$ as a solid). Metal particles can be deposited by photolyzing appropriate soluble precursors as described above.

In yet another aspect, the present invention provides a solid matrix as described above, in which the channel filler precursor materials have been removed from the polymerized matrix. The resulting matrix of polymerized inverse hexagonal phase-forming lyotropic liquid crystalline monomers contains an ordered array of hexagonally packed tubular channels. The "empty" matrices can then be modified to have utility in the same manner as "molecular sieves." More particularly, chemistry can be conducted in the channels to provide the matrix with different reactive properties. For example, derivatization of the hydrophilic head groups with appropriate functionality can provide a matrix or membrane with specificity for the removal of undesired materials from water (e.g., as ultrafiltration and electrodialysis membranes). Alternately, their unique chemical and channel structure allows the "empty" matrices to be used to catalyze chemical reactions in much the same way as zeolites and mesoporous sieves are utilized.

EXAMPLES

General

Unless otherwise noted, IR spectra of samples were measured as thin films on NaBr windows using a Perkin-Elmer 1615 series FT-IR spectrometer; the symbols s, m, w, and br were used to indicate strong, moderate, weak, and broad absorbtions, respectively. All NMR samples of monomer intermediates were prepared using deuterated chloroform as the solvent. All $^1H$ NMR spectra were measured on a Bruker AMX-300 spectrometer; the symbols s, d, t, q, and m were used to designate singlet, doublet, triplet, quartet, and multiplet signals, respectively. All $^{13}C$ NMR spectra were measured on a Bruker AMX-400 spectrometer. For intermediates with regioisomers, all resonances are listed. All polarized-light microscopy was conducted on a Leitz DMX RP polarizing, microscope. All low-angle X-ray diffraction studies of liquid-crystalline samples were performed using, an Inel CPS 120 diffractometer, and were verified against a Siemens D-5000 diffractometer.

Example 1

This example illustrates the preparation of the lyotropic liquid-crystalline monomer sodium p-styryloctadecenoate as outlined in FIG. 5.

1.1 Methyl 9-octadecenoate (1)

To a 250-mL round-bottom flask was added 42.0 g (0.149 mmol) of 9-octadecenoic acid and 80 mL of methanol. To the mixture was added 0.761 g (4.00 mmol) of p-toluenesulfonic acid. The mixture was heated at reflux under nitrogen for 14 h. The mixture was cooled to room temperature, and the solvents were removed. The crude product was dried over $MgSO_4$. Distillation of the crude product yielded 41.6 g (94.5%) of a clear, viscous liquid, bp 143° C. (35 mtorr). IR: 2922 (s), 2852 (s), 1743 (s, C=O), 1457 (s, $ROCH_3$) $cm^{-1}$. $^1H$ NMR (300 MHz): δ 5.33 (m, 2H, cis/trans isomerized), 3.65 (s, 3H, $COOCH_3$), 2.28 (t, 2H, J=7.2, $RCH_2COOCH_3$), 1.98 (q, 4H, J=6.15), 1.57 (quintet, 2H, J=7.2), 1.25 (m, 20H), 0.88 (t, 3H, J=6.6 Hz). $^{13}C$ NMR (101 MHz): δ 174.2 (RC(=O)$CH_3$), [129.9, 129.7] (RCH=CHR), 51.3 (RC(=O)$OCH_3$), 34.0 ($CH_2$), 31.9 (CH), 29.7 ($CH_2$), 29.6 ($CH_2$), 29.6 ($CH_2$), 29.5 ($CH_2$), 29.4 ($CH_2$), 29.3 ($CH_2$), 29.1 ($CH_2$), 29.1 ($CH_2$), 29.0 ($CH_2$), 27.2 ($CH_2$), 27.1 ($CH_2$), 24.9 ($CH_2$), 22.6 ($CH_2$), 14.0 ($CH_3$). Anal. Calcd for $C_{19}H_{36}O_2$: C, 76.97; H, 12.24. Found: C, 76.70; H, 12.12.

1.2 Methyl phenyloctadecanoate (2)

To a 125-mL Schlenk flask was added 19.8 g (0.149 mol) of $AlCl_3$ and 25 mL of freshly distilled benzene. A 100-mL pressure-equalizing addition funnel was attached to the flask under nitrogen flush. To the addition funnel was added a mixture of 30 mL and 41.2 g (0.139 mol) of 1. The solution of 1 was added to the $AlCl_3$ with stirring at a rate of approximately 1 mL per minute with the temperature moderated by an ice/water bath. The reaction mixture became brown and viscous, and large quantities of HCl gas were evolved. Once HCl gas evolution ceased, the mixture was allowed to stir at room temperature for an hour. The reaction mixture was slowly poured over an ice-chilled 1M aqueous HCl solution. The product was extracted with diethyl ether (3×100 mL). The combined ether extracts were washed with 100 mL saturated NaCl solution and 100 mL deionized water, then dried over $MgSO_4$. Removal of the solvents and distillation of the crude product yielded 29.6 g (56.7%) of a clear, viscous liquid, bp 181° C. (35 mtorr). IR: 2920(s), 2851(s), 1741(s, C=O), 1603 (w, phenyl), 1494 (m, phenyl), [761, 700] (m, monosubstituted phenyl). $^1H$ NMR (300 MHz): δ 7.31–7.12 (m, 5H, aromatic), 3.67 (overlapping s, 3H, RC(=O)$OCH_3$), 2.48 (m, 1H, RCHPhR), 2.29 (m, 2H, $RCH_2COOCH_3$), 1.56 (m, 6H), 1.21 (m, 22H), 0.86 (m, 3H, $RCH_3$). $^{13}C$ NMR (100 MHz): δ 174.2 (C=O), [146.3, 146.3, 146.3, 146.2] (Ipso phenyl), [128.2, 128.0, 127.7, 127.6, 127.0, 125.6] (phenyl), 51.5 (RC(=O)$OCH_3$), [47.8, 46.0, 45.7, 39.8, 39.2, 38.4, 36.9, 36.8, 36.7, 36.5, 34.0, 31.9, 31.9, 31.8, 31.7, 29.8, 29.7, 29.6, 29.6, 29.5, 29.4, 29.3, 29.3, 29.2, 29.2, 29.2, 29.1, 29.1, 29.0, 27.7, 27.6, 27.5, 27.5, 27.4, 27.2, 27.2, 24.9, 24.9, 24.9, 24.8, 22.8, 22.6, 22.6, 22.6, 22.3, 20.9] ($CH_2$), [14.3, 14.1] ($CH_3$). Anal. Calcd for $C_{25}H_{42}O_2$: C, 80.16; H, 11.30. Found: cC, 80.00; H, 11.03.

1.3 Methyl p-acetylphenyloctadecanoate (3)

(Note: reaction conditions should not be rigorously dry.) To a 250-mL round-bottom flask with a sidearm was added 21.3 g (0.160 mol) of $AlCl_3$. A 100 mL pressure-equalizing addition funnel was attached, and 50 mL of nitrobenzene was slowly added to the system. A dark yellow/brown solution formed. To the mixture was added 9.42 g (0.120 mol) of acetyl chloride dissolved in 50 mL of nitrobenzene. A solution of 29.3 g (78.1 mmol) of 2 and 40 mL of nitrobenzene was added dropwise with stirring over a period of 2 h, after which the solution was stirred under $N_2$ flush for 1 h. The product was pour slowly over ice-chilled 1M aqueous HCl. The product was extracted with ethyl acetate (3×200 mL). The combined ether extracts were washed with 100 mL saturated NaCl solution and 100 mL deionized water, then dried over $MgSO_4$. Nitrobenzene was removed from the product by distillation under vacuum. Further distillation yielded 25.7 g (78.9%) of a pale yellow liquid, bp 223° C. (80 mtorr). IR: 2923 (s), 2852 (s), 1740 (s, C=O ester), 1684 (s, C=O ketone), 1606 (m, phenyl), 829 (m, para-substituted phenyl). $^1H$ NMR (300 MHz): δ 7.87 (d, 2H, phenyl para to acetyl, J=8.4 Hz), 7.20 (d, 2H, phenyl para to alkyl, J=8.4 Hz), 3.67 (overlapping s, 3H, R(C=O)$OCH_3$), 2.56 (s, 3H, $CH_3C$(=O)Ph), 2.48 (m, 1H, RCHPhR), 2.28 (m, 2H, $RCH_2COOCH_3$), 1.56 (m, 6H), 1.21 (m, 22H), 0.86 (m, 3H, $RCH_3$). $^{13}C$ NMR (100 MHz): δ 197.8 ($CH_3C$(=O)Ph), 174.3 (R$COOCH_3$), 152.3 (ispo phenyl, alkyl), 135.0 (ipso phenyl, acyl), (128.4, 128.4, 128.2, 127.8, 127.8, 128.1, 125.6] (phenyl), 51.3 (RC(=O)$OCH_3$), [46.1, 46.0, 40.0, 38.0, 36.9, 36.7, 34.0, 31.8, 31.7, 31.6, 29.7, 29.6, 29.5, 29.5, 29.4, 29.3, 29.3, 29.2, 29.2, 29.1, 27.5, 27.4, 27.3, 26.4, 24.9, 24.8, 22.6, 22.4, 22.0] ($CH_2$), 14.1 ($CH_3$). Anal. Calcd for $C_{27}H_{44}O_3$: C, 77.84; H, 10.64. Found: C, 77.66; H, 10.90.

1.4 Methyl p-(1-hydroxyethyl)phenyloctadecanoate (4)

To a 250-mL round-bottom flask were added 25.4 g (61.0 mmol) of 3 and 75 mL of methanol. To a 100-mL flask was added 75 mL of methanol and 2.31 g (61.0 mmol) of $NaBH_4$ slowly with stirring. The $NaBH_4$ solution bubbled readily, and was rapidly transferred to the solution containing 3. The reaction mixture was allowed to stir for 30 minutes at room temperature. The product was poured over a 1M aqueous HCl solution, and 150 mL of ethyl acetate were added. The mixture was stirred for 15 minutes at room temperature. The ethyl acetate was isolated, and the HCl solution was extracted with additional ethyl acetate (2×50 mL). The combined extracts were washed with 50 mL of saturated aqueous NaCl solution and 50 mL of deionized water. Solvents were removed first by rotary evaporator, then under vacuum. The product, 25.0 g (97.8%) of a viscous yellow liquid, was not distilled so as to prevent polymerization. IR: 3421 (br, —OH), 2925 (s), 2851 (s), 1740 (s, C=O ester), 831 (m, para-substituted phenyl). $^1H$ NMR (300 MHz): δ [7.28–7.08] (4H, aromatic), 4.85 (q, 1H, $CH_3CH$(OH)Ph, =6.4 Hz), 3.67 (overlapping, s, 3H, RC(=O)$OCH_3$3), 2.46 (m, 1H, RCHPhR), 2.29 (m, 2H, $RCH_2COOCH_3$), 1.58 (m, 6H), [1.49,1.47] (m, 3H, $CH_3CH$(OH)Ph), 1.23 (m, 22H), 0.87 (m, 3H, $RCH_3$). $^3C$ NMR (100 MHz): δ 174.3 (R$COOCH_3$), [147.2, 145.6, 145.5, 145.3, 143.1, 143.0] (ispo phenyl), [127.7, 127.6, 127.0, 125.3, 125.2] (phenyl), 70.2 ($CH_3CH_2$(—OH)Ph), 51.3 (RC(=O)$OCH_3$), [47.4, 45.6, 45.4, 39.5, 39.1, 38.4, 36.9, 36.8, 36.6, 36.4, 34.0, 34.0, 31.9, 31.8, 31.8, 31.7, 30.8, 29.8, 29.7, 29.5, 29.5, 29.5, 29.4, 29.2, 29.2, 29.1, 29.1, 29.0, 28.9, 27.7, 27.6, 27.5, 27.3, 27.2, 27.1, 24.9, 24.7, 22.8, 22.7, 22.61 ($CH_2$), 14.1 ($CH_3$). Anal. Calcd for $C_{27}H_{44}O_2$: C, 77.46; H, 11.07. Found: C 77.59; H, 11.40.

1.5 Methyl p-styryloctadecanoate (5)

To a 1-L round-bottom flask were added 24.0 g (57.3 mmol) of 4, 0.545 g (2.87 mmol) of p-toluenesulfonic acid, 0.126 g (0.573 mmol) of BHT, 5 g of 4 Å dried molecular sieves, and 400 mL of benzene. The system was heated at reflux for 24 h., after which 5.0 g of $MgSO_4$ and an additional 0.50 g of p-toluenesulfonic acid were added. The system was heated at reflux for an additional 24 h. The intermediate product was washed with 200 mL of saturated NaCl solution and dried over MgSO$_4$. The product was purified by column chromatography, yielding 9.01 g (39.2%) of a viscous, pale yellow liquid. bp 213° C. (180 mtorr). IR: 2922 (s), 2851 (s), 1741 (s, C=O ester), 1464 (m, ROCH$_3$), [1629, 989, 902] (s, CH$_2$=CHR), 838 (m, para-substituted phenyl). $^1$H NMR (300 MHz) : δ [7.35–7.08] (4H, aromatic), 6.70 (1H, CH$_2$=CHR, J$_{trans}$=17.55 Hz, J$_{cis}$=10.95), 5.71 (1H, CH$_{trans}$H$_{cis}$=CHR, J$_{gem}$=0.90 Hz), 5.18 (1H, CH$_{trans}$H$_{cis}$=CHR, J$_{cis}$=10.95 Hz, J$_{gem}$=0.75 Hz), 3.67 (overlapping s, 3H, RC(=O)OCH$_3$), 2.46 (m, 1H, RCHPhR), 2.29 (m, 2H, RCH$_2$COOCH$_3$), 1.58 (m, 6H), 1.23 (m, 22H), 0.87 (m, 3H, RCH$_3$). $^3$C NMR (100 MHz): δ 174.2 (RCOOCH$_3$), 146.3 (ispo phenyl, alkyl), 136.8 (CH$_2$=CHPh), 134.8 (ipso phenyl, vinyl), [128.1, 127.8, 127.8, 127.6, 127.0, 126.1, 126.0, 125.6] (phenyl), 112.6 (CH$_2$=CHPh), 51.3 (RC(=O)OCH$_3$), [46.0, 45.8, 39.9, 39.2, 38.4, 37.0, 36.5, 34.1, 31.8, 31.7, 30.3, 29.7, 29.6, 29.5, 29.5, 29.4, 29.3, 29.3, 29.2, 29.2, 29.1, 27.6, 27.4, 26.3, 26.5, 24.9, 22.8, 22.6] (CH$_2$), 14.1 (CH$_3$). Anal. Calcd for C$_{27}$H$_{44}$O$_2$: C, 80.94; H, 11.07. Found: C 80.79; H, 10.88.

1.6 p-Styryloctadecanoic acid (6)

In a 100-mL round-bottom flask 0.978 g (24.4 mmol) of NaOH was dissolved in 50 mL of methanol. To this solution was added 8.90 g (22.2 mmol) of 5 dissolved in 25 mL of methanol. The flask was fitted with a condenser, and the solution was heated at reflux for 8 h. The cooled product was poured into a 1M aqueous HCl solution with stirring. The mixture was extracted with hexanes (3×75 mL), and the combined ether extracts were washed once with 50 mL sat. NaCl solution and 50 mL deionized water. The resulting product was agitated under vacuum to remove residual hexanes, affording 8.47 g (98.5%) of a viscous, pale-yellow liquid. IR: 3083 (s, br, COOH), 2925 (s), 2854 (s), 1710 (s, C=O), [1630, 989, 902] (s, CH$_2$=CHR), 838 (m, para-substituted phenyl). $^1$H NMR (300 MHz) : δ [7.35–7.08] (4H, aromatic), 6.71 (1H, CH$_2$ =CHR, J$_{trans}$=17.7 Hz, J$_{cis}$=10.8), 5.72 (1H, CHtransH$_{cis}$=CHR, J$_{trans}$=17.55 Hz, J$_{gem}$=1.05 Hz), 5.19 (1H, CH$_{trans}$H$_{cis}$=CHR, J$_{cis}$=10.95 Hz, J$_{gem}$=0.75 Hz), 2.47 (m, 1H, RCHPhR), 2.29 (m, 2H, RCH$_2$COOCH$_3$), 1.59 (m, 6H), 1.22 (m, 22H), 0.87 (m, 3H, RCH$_3$). $_{13}$C NMR (100 MHz) : δ 180.3 (RCOOCH$_3$), [146.4, 146.3, 146.2] (ispo phenyl, alkyl), 136.8 (CH$_2$=CHPh), 134.8 (ipso phenyl, vinyl), [128.1, 127.8, 127.7, 126.0] (phenyl), 112.6 (CH$_2$=CHPh), [46.0, 45.8, 37.0, 37.0, 36.9, 34.0, 32.0, 31.9, 31.9, 31.8, 29.7, 29.7, 29.6, 29.6, 29.5, 29.4, 29.3, 29.3, 29.2, 29.1, 29.0, 28.9, 27.6, 27.5, 27.4, 27.3, 24.6, 24.5, 22.8, 22.7, 22.6, 22.6] (CH$_2$), 14.1 (CH$_3$). Anal. Calcd for C$_{26}$H$_{42}$O$_2$: C, 80.77; H, 10.95. Found: C 80.63; H, 10.86.

1.7 Sodium p-styryloctadecanoate (7)

To a 50-mL round-bottom flask was added 2.50 g (6.47 mmol) of 6 and 10 mL of methanol. A solution of 0.264 (6.60 mmol) of NaOH in 10 mL of methanol was added slowly to the solution of 6. The solvents were removed under vacuum, leaving behind a pale yellow, sticky solid. IR: 2923 (s), 2851 (s), 1564 (s, C=O), [1630, 988, 902] (s, CH$_2$=CHR), 838 (m, para-substituted phenyl). $^1$H NMR (300 MHz, CD$_3$OD): δ [7.23–6.96] (4H, aromatic), 6.59 (1H, CH$_2$=CHR, J$_{trans}$=17.6 Hz, J$_{cis}$=11–1), 5.60 (1H, CH$_{trans}$H$_{cis}$=CHR, J$_{trans}$=17.4 Hz), 5.04 (1H, CH$_{trans}$H$_{cis}$=CHR, J$_{cis}$=10. 8 Hz), 2.36 (m, 1H, RCHPhR), 2.03 (m, 2H, RCH$_2$COOCH$_3$), 1.45 (m, 6H), 1.13 (m, 22H), 0.87 (m, 3H, RCH$_3$). $^{13}$C NMR (100 MHZ) : δ 183.2 (RCOOCH$_3$), 147.2 (ispo phenyl, alkyl), 138.6 (CH$_2$=CHPh), 136.9 (ipso phenyl, vinyl), [129.4, 129.0, 128.8, 127.3] (phenyl), 113.1 (CH$_2$=CHPh), [49.8, 49.6, 49.4, 49.2, 48.9, 48.7, 48.5, 47.1, 39.4, 38.3, 33.2, 31.1, 30.9, 30.9, 30.8, 30.6, 28.8, 28.0, 23.9] (CH$_2$), 14.7 (CH$_3$). Anal. Calcd for C$_{26}$H$_{41}$O$_2$Na : C, 76.43; H, 10.11. Found: C 75.22; H, 10.24.

Example 2

This example illustrates the synthesis of lyotropic liquid-crystalline monomer sodium 3,4,5-tris(11'-acryloyloxyundecyloxy)benzoate according to FIG. 6.

2.1 Methyl-3,4,5-trihydroxybenzoate (2)

3,4,5-trihydroxybenzoic acid (20.00 g, 0.118 mol) is dissolved in 250 mL absolute methanol. Sulfuric acid (2 g, 98%) was added and the solution was refluxed over night (TLC in EtOAc:hexanes=75:25; Rf=2.25 shows quantitative conversion—no starting material present). The solution was neutralized with 10% aqueous NaOH. Excess methanol was removed under reduced pressure and 200 mL of water was added to the residue. The resulting solution was extracted 3 times with portions of 200 mL EtOAc, dried over Na$_2$SO$_4$ and filtered over a plug of silica topped with activated carbon. Removal of solvent provided the desired product which is light sensitive. Yield: 18.40 g (84.99%). Elem. Anal. C$_8$H$_8$O$_5$, MW=184.14, calc: C, 52.20; H, 4.40. Found: C, 52.21; H, 4.54. IR: 3421 (O—H), 2928, 2847 (C—H), 1727 (C—O), 1589, 1505, 1340 (C=C, arom), ring breathing, 1436, 1467 (CH)$_2$, scissoring, 1221 C—O—C (alkyl aryl ether stretch), 1128, 1107 (CH)$_2$ twisting, 1059 C—OH (C—O stretching), 933, 897, 861, 764 aromatic substitution pattern, 721 (CH)$_2$ rocking. $^1$H NMR: 9.183 (br s, 3H, O—H), 6.910 (s, 2H, ar-H), 3.700 (s, 3H, CH$_2$CH$_3$). $^{13}$C NMR: 167.08 (carbonyl), 146.32 (meta, aromatic), 139.14 (para, aromatic), 120.05 (ipso, aromatic), 109.25 (ortho, aromatic), 52.33 (methyl ester).

2.1 3,4,5-Tris(11'-hydroxyundecyloxy)benzoic acid (3)

Methyl 3,4,5-trihydroxybezoate (9.84 g, 0.0534 mol) was dissolved in 250 mL dry DMF. K$_2$CO$_3$ (73.80 g, 0.534 mol) was added and the heterogenous mixture was stirred vigorously. The mixture was warmed to 70°–80° C. and 44.32 g (0.176 mol) of 11-bromoundecanol was added slowly. The mixture was stirred for 12 hr at 70°–80° C. TLC (EtOAc:hexanes=50:50) shows complete consumption of bromoundecanol (R$_f$=1.6). The reaction mixture was cooled and the remaining solid was removed. DMF was removed under reduced pressure (Rotavap, 80° C.) and water (250 mL) was added. The resulting mixture was extracted with 3×200 mL portions of EtOAc. The combined organic phases were dried over Na$_2$SO$_4$ and the solvent was removed. The remaining solids were dissolved in 300 mL of a CH$_3$OH:H$_2$O=3:1 mixture containing 56.11 g (0.433 mol) of KOH and heated to reflux overnight. The homogeneous solution was neutralized with 3M HCl solution and extracted with EtOAc. The combined EtOAc portions were collected and dried over Na$_2$SO$_4$ and filtered. The solvent was removed and the solids were recrystallized from EtOAc. Yield: 28.9 g (79.5%). Elem. Anal. C$_{40}$H$_{72}$O$_8$, MW=681.1, calc: C, 70.50; H, 10.70. Found: C, 70.28; H, 11.02. IR: 3236.4 (br), 3330.6 O—H, 2918, 2847 C—H, 1680, 1586, 1502, 1330, 1430, 1463, 1221, 1058, 1122, 1210. $^1$H NMR: (d$_6$-DMSO)-δ 12.83 (br s, 1H, RCO$_2$H), 7.15 (s, 2H, ar-H), 4.27 (s, 3H, O—H), 3.89 (t, 6H, R—CH$_2$—OH), 1.68 (t, 6H, ar—O—CH$_2$—R), 1.30 (m, 56H, —CH$_2$—). $^{13}$C NMR (d$_6$-DMSO): 167.43 (carbonyl), 152.70 (meta, aromatic), 141.51 (aromatic, para), 126.02 (ipso, aromatic), 107.78 (ortho, aromatic), 73.46 ar—O—CH$_2$—R (para), 69.13 ar—O—CH$_2$—R (meta), 62.95 R—CH$_2$—OH, 32.76, 30.30, 29.61, 29.53, 29.48, 29.35, 29.28, 26.04, 25.76 {—(CH)$_2$—}×9.

2.3 3,4,5-Tris(11'-acryloyloxyundecyloxy)benzoic acid (4)

3,4,5-Tris(11'-hydroxyundecyloxy)benzoic acid (10 g, 0.0147 mol) was dissolved in 80 mL dioxane and N,N-dimethylaniline (5.88 g, 0.0485 mol) was added. The mixture was warmed to 60° C. and 4.39 g (0.0485 mol) of acryloyl chloride were added slowly. The resulting mixture was stirred for 1 hour (rxn complete by TLC) and then 1 mL of $CH_3OH$ was added. The solution was poured into 300 mL of 1.2M HCl and extracted 3 times with 200 mL portions of EtOAc. The EtOAc phases were dried over $Na_2SO_4$ and filtered over a silica plug. The solvent was removed under reduced pressure and the product was recrystallized from EtOAc. Yield: 10.8 g (87.2%). Elem. Anal. $C_{49}H_{78}O_{11}$, MW=843.15, calc: C, 68.90; H, 9.32. Found: C, 68.91; H, 9.20. IR: 3236.4 (br) RCO2—H, 2918, 2847 C—H, 1723 carbonyl of acrylate, 1684 R(C=O)OH stretch, 1586, 1502, 1331 aromatic ring breathing, 1430, 1467 methylene scissoring, 1408 C=C—H bending (in plane), 1385 RC(=O)—O—H bending, 1271, 1296, 1226 RC(=O)—OH stretch (and RC(=O)—O <acrylate> stretch), 1226 C—C(=O) stretch (for acrylate), 1210 C—O stretch of RCO2H, 1221 alkyl aryl ether stretch, 1125 methylene twisting, 1189 C—C(=O) stretch (for RCO2H), 1062 <acrylate> O—C—C stretch, 810 C=C—H bending, out of plane. $^1$H NMR: ($D_6$-acetone) δ 12.83 (br s, 1H, $RCO_2H$), 7.27 (s, 2H, ar-H (ortho)), 6.32 (dd, 3H, $CH_2$=CH—C(=O)OR), 6.13 (dd, 3H, $CH_2$=CH—C(=O)OR (trans to carbonyl)), 5.86 (dd, 3H, $CH_2$=CH—C(=O)OR (cis to carbonyl)), 4.18 (t, 6H, $CH_2$—O—<acrylate>), 4.05 (t, 6H, ar—O—$CH_2$—R), 1.32 (m, 56H, —$CH_2$—). $^{13}$C NMR ($D_6$-acetone): 166.44 RC02H, 165.46 carbonyl of acrylate, 152.89 (aromatic, meta), 129.936 C=$CH_2$ (of acrylate), 128.718 C(=O)—CH=$CH_2$, 125.178 (aromatic, ipso), 107.92 (aromatic, ortho), 72.81 ar—O—$CH_2$R (para), 68.75 ar—O—CH2R (meta), 64.10 R—$CH_2$—<acrylate>, 32.76, 30.30, 29.61, 29.53, 29.48, 29.35, 29.28, 26.04, 25.76 {—$(CH)_2$—}×9.

2.4 Sodium 3,4,5-Tris(11'-acryloyloxyundecyloxy) benzoate (1)

3,4,5-Tris(11'-acryloyloxyundecyloxy)benzoic acid (1.00 g, 0.0011981 mol) was dissolved in 150 mL of tetrahydrofuran. Sodium hydroxide (0.44 g of a 10% NaOH aqueous solution) was then added and the reaction was stirred for 30 min. The solvents were removed in vacuo by rotary evaporation. Residual water was removed via azeotrope with 30 mL of acetone under reduced pressure. Yield: 1.02 g (100%). Elem. Anal. $C_{49}H_{77}O_{11}Na$, MW=864, calc: C, 68.06; H, 8.91. Found: C, 67.31; H, 9.21. IR: 2923, 2851 C—H, 1728 carbonyl stretch, 1637, 1618 C=C stretch, 1576, 1500 aromatic breathing, 1556, 1380 carboxylate, 1467 methylene scissoring, 1122 methylene twisting, 1062 <acrylate>—O—C—C stretch, 1190, 1121 allyl-C(=O) stretch, 1271, 1296 allyl—C(=O)—OR stretch, 1408, 810 C=C—H bending. $^1$H NMR: δ 7.20 (s, 2H), 6.24 (dd, 3H), 6.10 (dd, 3H), 5.85 (dd, 3H), 4.05 (t, 6H), 3.80 (t, 6H), 1.4 (m, 54H). $^{13}$C NMR: 212.60 carboxylate carbon, 165.82 ester carbonyl, 151.77 (aromatic, meta), 131.52 C=$CH_2$, 128.79 C(=O)—CH=$CH_2$, 125.306 (aromatic, ipso), 107.25 (aromatic, ortho), 72.60 ar—O—$CH_2$ (meta), 68.373 ar—O—$CH_2$ (para), 64.432 R—$CH_2$—<acrylate>, 32.76, 30.30, 29.61, 29.53, 29.48, 29.35, 29.28, 26.04, 25.76 {—$(CH)_2$—}×9.

Example 3

This example illustrates the polymerization of inverse hexagonal-forming lyotropic liquid-crystalline monomers to form matrices having ordered hexagonally-packed tubular channels. Subsequent polymerizations of the channel filler provided the nanocomposites.

3.1 Ordered Nanocomposites from Sodium p-styryloctadecenoate as the matrix monomer and a solution of tetraethylorthosilicate as a channel filler An ordered nanocomposite with hexagonally arranged channels containing silica was synthesized using sodium p-styryloctadecanoate (1) as the matrix monomer and a solution of tetraethylorthosilcate (TEOS, see Hench, et al., *Chem. Rev.* 90:33 (1990), incorporated herein by reference) as the reactive hydrophilic component. An organic photoinitiator and a crosslinking agent were co-dissolved in the organic regions of the liquid-crystalline phase in order to produce a highly crosslinked network upon photolysis. A water-soluble photoacid generator (2-hydroxy-2-methylpropiophenone, see MacDonald, et al., *Acc. Chem. Res.* 27:151 (1994), incorporated herein by reference) was dissolved in the hydrophilic channels in order to initiate acid-catalyzed silica condensation in situ (see, Wei, et al., *Adv. Mater.* 6:372 (1994), incorporated herein by reference).

Sodium p-styryloctadecenoate is a polymerizable styrene analog of lithium stearate, a molecule which is known to adopt the inverse hexagonal phase (see, Harrison, et al., *J. Phys. Chem.* 95:4136 (1991)). The monomer is prepared as described in Example 1.

Initial phase characterization studies revealed that mixtures of sodium p-styryloctadecenoate containing small amounts of 1,4-divinylbenzene (ca. 5–10 wt %), 2-hydroxy-2-methylpropiophenone (an organic photoinitiator) (ca. 2 wt %), and pure water (2–20 wt %) form a well-defined inverse hexagonal phase, as confirmed by polarized light microscopy and low angle x-ray diffraction. The optical textures of these mixtures are consistent with those of other hexagonal phases encountered in the literature. The low water content in these mixtures ($\leq$20 wt %) indicates that they are indeed inverse mesophases. The hexagonal architecture in these samples was confirmed by low-angle x-ray diffraction, yielding, a characteristic spacing ratio of $$1:\frac{1}{\sqrt{3}}:\frac{1}{\sqrt{4}}:\frac{1}{\sqrt{7}}:\frac{1}{\sqrt{9}}:\frac{1}{\sqrt{12}}\cdots$$

Subsequent reagent compatibility studies demonstrated that sodium p-styryloctadecenoate also adopts the desired inverse hexagonal mesophase in the presence of TEOS solution. For example, a mixture containing 73 wt % 1; 15 wt % divinylbenzene; 2 wt % 2-hydroxy-2-methylpropiophenone; and 10 wt % of a solution containing 44.8% TEOS, 38.8% ethanol, 15.8% $H_2O$, and 0.6% diphenyliodonium chloride (a water-soluble photoacid), exhibits the characteristic optical texture and x-ray diffraction spacings of a hexagonal ensemble (FIG. 7). The primary reflection yielded a $d_{100}$ spacing of 35.4 Å, corresponding, to an interchannel distance of 40.9 Å. The unit cell dimensions of the inverse hexagonal phase, and thus the diameters of the hydrophilic channels, change only slightly when a hydrophilic TEOS solution is used in place of water for phase formation.

Photopolymerization of the lyotropic liquid-crystalline mixture containing, TEOS, as described above, proceeded with retention of phase architecture. The initial monomer mixture is a colorless, translucent, viscous mixture. After irradiation with 365 nm light (1800 $\mu W/CM^2$) under nitrogen for 24 h, the product is a tough, pale-yellow, clear, glassy material that is completely insoluble in common organic solvents and water. UV-visible analysis of the initial unpolymerized mixture showed absorptions centered at $\lambda_{max}$=208 and 254 nm. After photolysis, the absorptions shift to 194 and 246 nm, respectively, with a marked decrease in the intensity of the second peak. IR spectra taken of samples before and after polymerization show the disappearance of olefinic bands at 1630, 989, and 902 cm$^{-1}$. These data are consistent with the loss of the conjugated olefinic functionalities and a high degree of polymerization. Polarized light microscopy analysis of the mixture before and after photopolymerization revealed nearly identical optical textures. Similarly, x-ray diffraction analysis of the monomer mixture before and after photolysis revealed the same set of diffraction peaks with only a small change (4.0%) in unit cell dimensions and a reduction in intensity of the primary reflection (cf. FIGS. 10(*a*) and 10(*b*)). These data are consistent with preservation of the hexagonal nanoarchitecture upon network formation.

Sonication of a powdered nanocomposite sample with CDCl$_3$, CD$_3$OD, and D$_2$O, and subsequent $^1$H NMR analysis of the extracts indicated that no residual free monomer, divinylbenzene, or TEOS remained. Thus both organic network formation and silica condensation occur upon photolysis at room temperature. $^{29}$Si solid-state NMR spectroscopy was used to verify the extent of condensation of TEOS within the matrix. Silicon centers in silicates are typically designated Q$^n$, where n represents the number of adjoining, siloxy substituents, as opposed to hydroxy or alkoxy substituents. Strong resonances at −112 and −100 ppm relative to tetramethylsilane (TMS) and a weak resonance at −88 ppm (letter (*a*) in FIG. 9) are characteristic of a highly crosslinked, photoacid-condensed silica network consisting, mostly of Q$^4$ and Q$^3$ silicon centers, with a small amount of Q$^2$ centers, respectively. Although silica condensation is not complete after photolysis at room temperature, the predominance of the di- and trisiloxysilane peaks in the $^{29}$Si NMR spectrum of the nanocomposite (letter (*b*) in FIG. 9) indicates that the encapsulated silica gel is also crosslinked to a high degree. This occurs without destruction of the order of the surrounding matrix. The degree of condensation can be further enhanced by heating the material under vacuum to drive off water. Thermogravimetric analysis (TGA) revealed that the onset of decomposition of the silica nanocomposite is 438° C. (10° C./min ramp rate under nitrogen). The crosslinked polymer matrix itself is thermally stable up to 429° C. under the same conditions.

Small modifications in the structure of the amphiphilic monomer can be used to alter the unit cell dimensions of the matrix in a highly uniform fashion and, in some instances, change the geometry of the phase entirely. For example, a sample formed with sodium p-styryloctadecenoate, divinylbenzene, and water exhibits an inverse hexagonal phase with a primary diffraction peak at 35.4 Å; a sample formed with the corresponding potassium salt exhibits a complex lamellar phase with a primary reflection at 39.7 Å; and a sample formed with the calcium disalt analog exhibits an inverse hexagonal phase with a primary reflection at 30.9 Å. Although lyotropic liquid-crystalline phases typically have fairly broad regions of stability with respect to system composition and temperature, subtle changes in amphiphile structure such as the nature of the counterion can have a dramatic effect on phase architecture. The dependence of lyotropic liquid-crystalline phases on amphiphile structure, system composition, and temperature offers viable avenues for performing true nanometer-scale materials engineering using the described nanocomposite synthesis strategy.

3.2 Ordered Nanocomposites from Sodium 3,4,5-Tris(11'-acryloyloxyundecyloxy)benzoate as the matrix monomer and a PPV precursor solution as a channel filler A hexagonally ordered nanocomposite containing PPV was formed by initially mixing an aqueous solution of the PPV precursor, poly(p-xylylenedimethylsulfonium chloride, prepared according to Lenz, et al., *Polymer* 30:1041 (1989)), with monomer sodium 3,4,5-tris(11'-acryloyloxyundecyloxy)benzoate and an organic radical photoinitiator (2-hydroxy-2-methylpropiophenone) to establish the desired inverse hexagonal liquid-crystalline phase. In order to generate the PPV nanocomposite, a 1 wt % aqueous solution of poly(p-xylylenedimethylsulfonium chloride) was used as the hydrophilic component in the formation of the phase. A mixture of 80 wt % sodium 3,4,5-tris(11'-acryloyloxyundecyloxy)benzoate, 10 wt % of the PPV precursor solution, and 10 wt % of a p-xylene solution containing 20% photoinitiator, was found to afford a well-defined, stable inverse hexagonal phase at ambient temperature. The optical texture of this mixture under the polarized light microscope is consistent with that of a lyotropic inverse hexagonal mesophase. The x-ray diffraction profile exhibits d spacings with ratios of $$1 : \frac{1}{\sqrt{3}} : \frac{1}{\sqrt{4}} : \frac{1}{\sqrt{7}} : \frac{1}{\sqrt{9}} : \frac{1}{\sqrt{12}} \ldots$$

indicative of a hexagonal phase.

Polymerization with retention of phase architecture was performed by irradiating the viscous liquid-crystalline monomer mixture with 365 nm light in air, either in the bulk or as thin films. The resulting material is a tough, pale yellow, translucent polymer resin that is insoluble in common solvents. The polymer exhibits an optical texture under crossed polarizers and an x-ray diffraction profile (FIG. 10*b*) virtually identical to that of the liquid-crystalline monomer mixture. The unit cell dimensions in the photopolymerized material are slightly smaller, consistent with a slight volume contraction upon network formation. A high degree of crosslinking occurs upon photolysis, as confirmed by the almost complete disappearance of the acrylate bands at 1635, 985, and 810 cm$^{-1}$ in the FT-IR spectrum of the photolyzed material. Extraction of the polymer with deuterated solvents and subsequent $^1$H NMR analysis of the extracts also did not reveal any residual free monomer. The hexagonal nanoarchitecture was confirmed unequivocally by transmission electron microscopy (TEM). As can be seen in FIG. 11, the photopolymerized material consists of a regular, hexagonal array of channels approximately 40 Å in diameter, in excellent agreement with the x-ray diffraction results. The PPV precursor is believed to reside solely in the aqueous channels of the liquid-crystalline monomer phase and the resulting polymerized network because the precursor is a highly charged polyelectrolyte that is completely insoluble in nonpolar media.

Conversion of the PPV precursor in the nanocomposite proceeds partially during photolysis of the liquid-crystalline monomer mixture but the reaction can be accelerated by thermal treatment. The concentration of PPV (<0.1 wt %) in the composite is well below the detection limit of many characterization techniques such as UV-visible, solid-state $^{13}$C NMR, FT-IR, and Raman spectroscopy; however, the degree of PPV conversion can be monitored qualitatively by fluorescence spectroscopy. A typical PPV nanocomposite film photopolymerized at ambient temperature exhibits intense fluorescence at 504 and 534 nm when excited with 370 nm light, even though the electronic absorptions of the PPV segments in the composite are too weak to be observed by UV-visible spectroscopy. In comparison, poly(p-xylylenedimethylsulfonium chloride) exhibits only very weak fluorescence under the same conditions (due to a small amount of spontaneous conversion at room temperature), whereas pure PPV prepared by heating the precursor at 220° C. in vacuo exhibits relatively strong fluorescence at 517 and 547 nm. When the nanocomposite is subjected to the same thermal treatment to drive the PPV conversion process, its fluorescence intensity at first increases dramatically as a function of heating time. This behavior is consistent with an increase in the number of emitting PPV segments as a higher degree of conversion is achieved. The wavelengths of emission remain essentially unchanged during the conversion process. After 4 h at 220° C., the ordered nanocomposite, which contains less than 0.1 wt % PPV, emits approximately 2.0 times more light per unit volume than pure PPV over the 400–700 nm range. This ratio translates into a very large photoluminescence enhancement based on the amount of PPV in the two samples.

Photoluminescence enhancement in conjugated polymers has been reported for polymers that can be dissolved in solution or interchain-separated in amorphous composites and copolymers to minimize self-quenching mechanisms (see, Smilowitz, et al., *J. Phys. Chem.* 98:6504 (1993) and Jenekhe, et al., *Chem. Mater.* 6:1906 (1994)). While dilution of the PPV segments or chains may be responsible for part of the enhanced fluorescence in the present nanocomposite, the nanometer-scale order of the system also plays a role as a dramatic reduction in fluorescence intensity occurs when the order in the composite is degraded after 20 h at 220° C. Thermogravimetric analysis of the nanocomposite indicated that only a 3 % weight loss occurs after this heating period. Thus, the fluorescence enhancement cannot be due entirely to a simple dilution effect because the effective concentration of PPV in the composite is not significantly affected by the heating process. Thermal decomposition of the PPV or the matrix also cannot account for this behavior because PPV is thermally stable up to 570° C. under inert atmosphere, and IR analysis of composite did not reveal any significant chemical changes during the heating, except for the loss of residual acrylate groups.

The differences in the fluorescence spectra and the emission behavior of the present nanocomposite and pure PPV indicate that the ordered, ionic channels of the matrix represent a substantially different local environment for PPV.

Example 4

This example illustrate the formation of nanocomposites which are thin films and fibers.

In terms of processing, the nanocomposite can be easily fabricated into highly aligned free-standing thin films and fibers. Thin films several square centimeters in area with the aqueous channels almost uniformly aligned perpendicular to the film surfaces were produced by heating the monomer mixture into a fluid, isotropic state between glass slides, pressing the fluid into a film, and allowing the mixture to slowly cool between the plates before photopolymerization. The films are almost uniformly dark under crossed polarizers but appear bright around areas of applied stress. When ground up, the films exhibit the x-ray diffraction pattern for a hexagonal phase which is consistent with overall homeotropic alignment.

Highly anisotropic fibers can be obtained by extruding the viscous monomer mixture through a syringe needle and photopolymerizing the resulting fiber.

All publications, patents and patent applications mentioned in this specification are herein incorporated by reference into the specification to the same extent as if each individual publication, patent or patent application was specifically and individually indicated to be incorporated herein by reference.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. An ordered nanocomposite of a matrix component and a filler component, said matrix comprising polymerized inverse hexagonal-forming lyotropic liquid-crystalline monomers and defining a hexagonally-packed array of tubular channels, said filler component being present in said tubular channels.

2. A nanocomposite in accordance with claim 1, wherein said inverse hexagonal-forming lyotropic liquid-crystalline monomers have a critical packing parameter of greater than 2.

3. A nanocomposite in accordance with claim 1, wherein said matrix comprises polymerized inverse hexagonal-forming lyotropic liquid-crystalline monomers which have been polymerized in the presence of a crosslinker.

4. A nanocomposite in accordance with claim 1, wherein said monomers have a hydrophophilic head group and a branched hydrophobic tail group, said hydrophilic head group being a member selected from the group consisting of a carboxylate salt, a phosphonate salt, a phosphate salt, a sulfate salt, a sulfonate salt, a sulfonium group, and an ammonium salt, wherein said tail group contains a polymerized group.

5. A nanocomposite in accordance with claim 4, wherein said polymerized group is present in said monomer prior to said polymerization as a member selected from the group consisting of an acrylate, a styrene, a vinyl ester, a 1,3-diene and an acrylamide.

6. A nanocomposite in accordance with claim 1, wherein said filler component is an organic polymer.

7. A nanocomposite in accordance with claim 6, wherein said second organic polymer is a conjugated polymer selected from the group consisting of photoluminescent polymers and electroactive polymers.

8. A nanocomposite in accordance with claim 1, said nanocomposite is formed into a fiber.

9. A nanocomposite in accordance with claim 1, said nanocomposite is formed into a film.

10. A nanocomposite in accordance with claim 1, wherein said filler component is an inorganic material selected from the group consisting of magnetic ceramic particles, semiconductors, metal particles, alumina, silica, and metal salts.

11. A nanocomposite in accordance with claim 1, wherein said monomers, in an unpolymerized form, have the formula:

$$HG^1\text{—}T\text{—}(X^1\text{—}PG^1)_n \qquad (I)$$

wherein $HG^1$ represents a hydrophilic head group;

T represents a bond or a template for the attachment of lipid tail groups, said template being selected from the group consisting of aromatic rings, monosaccharides, and polyhydroxylated lower alkyl groups;

each $X^1$ independently represents a lipid tail group having from 8 to 24 carbon atom in a linear or branched chain and optionally interrupted by one or more heteroatom groups selected from the group consisting of —O—, —NH—, —NR—, and —S— wherein R is a lower alkyl or lower acyl group;

each PG$^1$ is a polymerizable group; and n is an integer of from 1 to 4.

12. A nanocomposite in accordance with claim 11, wherein T is a phenyl ring and n is from 2 to 4.

13. A nanocomposite in accordance with claim 11, wherein HG$^1$ is a carboxylic acid salt, T is a phenyl ring, n is from 2 to 3, and each PG$^1$ is an acrylate group.

14. A nanocomposite in accordance with claim 11, wherein HG$^1$ is a carboxylic acid salt, T is a bond, n is 1, PG$^1$ is styryl group, and X$^1$ is a branched chain alkyl group having from 12 to 24 carbon atoms.

15. A nanocomposite in accordance with claim 11, wherein HG$^1$ is a carboxylic acid salt, T is a bond, n is 1, PG$^1$ is styryl group, X$^1$ is a straight chain alkyl group having from 12 to 24 carbon atoms, and PG$^1$ is attached to X$^1$ at a non-terminus position.

16. A method of forming an ordered nanocomposite comprising a matrix component of polymerized inverse hexagonal-forming lyotropic liquid-crystalline monomers and having hexagonally-packed tubular channels, said method comprising:

(a) combining a quantity of polymerizable inverse hexagonal-forming monomers, an aqueous or polar organic solvent, and channel filler precursor materials to form a pre-polymer mixture in which said polymerizable monomers adopt an inverse hexagonal phase around said aqueous or polar organic solution; and (b) polymerizing said pre-polymer mixture to form said nanocomposite matrix component having hexagonally-packed tubular channels.

17. A method in accordance with claim 16, wherein said polymerizing is initiated by ultraviolet light or heat.

18. A method in accordance with claim 16, wherein said polymerizing is initiated by a radical initiator.

19. A method in accordance with claim 16, wherein said pre-polymer mixture further comprises a crosslinker.

20. A method in accordance with claim 16, wherein said aqueous or polar organic solution further comprises inorganic precursors to solid state materials.

21. A method in accordance with claim 16, where in said aqueous or polar organic solution further comprises a sol-gel silica precursor solution.

22. A method in accordance with claim 21, wherein said matrix is an ordered polymer-inorganic nanocomposite, said method further comprising:

(c) polymerizing said sol-gel silica precursor solution.

23. A method in accordance with claim 16, wherein said aqueous or polar organic solution further comprises a conjugated organic, photoluminescent polymer precursor.

24. A method in accordance with claim 23, further comprising:

(c) converting said precursor to a conjugated organic, photoluminescent polymer.

25. A method in accordance with claim 16, wherein prior to said polymerizing, said pre-polymer mixture is formed into a thin film.

26. A method in accordance with claim 16, wherein prior to said polymerizing, said pre-polymer mixture is extruded into a fiber.

27. A method in accordance with claim 16, wherein said channels have a diameter of from about 2 to about 6 nanometers.

28. A matrix having an ordered array of hexagonally spaced tubular channels formed by the polymerization of inverse hexagonal phase-forming monomers, said channels having a diameter of from about 2 to about 6 nanometers.

29. A nanocomposite formed by the method of claim 16.

30. An inverse hexagonal phase-forming lyotropic liquid-crystalline compound having the formula:

$$HG^1-T-(X^1-PG^1)_n \qquad (I)$$

wherein

HG$^1$ represents a hydrophilic head group;

T represents a bond or a template for the attachment of lipid tail groups, said template being selected from the group consisting of aromatic rings, monosaccharides, and polyhydroxylated lower alkyl groups;

each X$^1$ independently represents a lipid tail group having from 8 to 24 carbon atom in a linear or branched chain and optionally interrupted by one or more heteroatom groups selected from the group consisting of —O—, —NH—, —NR—, and —S— wherein R is a lower alkyl or lower acyl group;

each PG$^1$ is a polymerizable group; and n is an integer of from 1 to 4.

31. A compound in accordance with claim 30, wherein T is a phenyl ring and n is from 2 to 4.

32. A compound in accordance with claim 30, wherein HG$^1$ is a carboxylic acid salt, T is a phenyl ring, n is from 2 to 3, and each PG$^1$ is an acrylate group.

33. A compound in accordance with claim 30, wherein HG$^1$ is a carboxylic acid salt, T is a bond, n is 1, PG$^1$ is styryl group, and X$^1$ is a branched chain alkyl group having from 12 to 24 carbon atoms.

34. A compound in accordance with claim 30, wherein HG$^1$ is a carboxylic acid salt, T is a bond, n is 1, PG$^1$ is styryl group, X$^1$ is a straight chain alkyl group having from 12 to 24 carbon atoms, and PG$^1$ is attached to X$^1$ at a non-terminus position.

* * * * *